United States Patent [19]

Carpenter et al.

[11] 4,293,915
[45] Oct. 6, 1981

[54] PROGRAMMABLE ELECTRONIC REAL-TIME LOAD CONTROLLER

[75] Inventors: Edward J. Carpenter, Lynnwood; William W. Korff, Seattle, both of Wash.; Alan E. Zoerb, deceased, late of Seattle, Wash., by Delores E. Zoerb; Lawrence J. Barello, Bellevue, Wash.; Donald R. Hall, Edmonds, Wash.; Orlien N. Becker, Lynnwood, Wash.

[73] Assignee: Pacific Technology, Inc., Renton, Wash.

[21] Appl. No.: 30,348

[22] Filed: Apr. 16, 1979

[51] Int. Cl.³ .................... G01R 21/00; G06F 15/06
[52] U.S. Cl. .................................... 364/493; 364/107; 307/39
[58] Field of Search ............... 364/492, 493, 103, 107, 364/121, 120, 900, 104; 325/396; 358/192; 219/506; 307/35, 39, 41; 455/171, 181

[56] References Cited

U.S. PATENT DOCUMENTS

| | | | |
|---|---|---|---|
| 4,004,085 | 1/1977 | Makino et al. | 325/396 |
| 4,071,745 | 1/1978 | Hall | 364/120 |
| 4,081,753 | 3/1978 | Miller | 325/396 |
| 4,106,097 | 8/1978 | Fox et al. | 364/492 |
| 4,125,782 | 11/1978 | Pollnow, Jr. | 364/493 |
| 4,153,936 | 5/1979 | Schmitz et al. | 364/493 |
| 4,162,513 | 7/1979 | Beyers, Jr. et al. | 325/396 |
| 4,193,120 | 3/1980 | Yello | 364/104 |
| 4,213,182 | 7/1980 | Eichelberger et al. | 364/120 |
| 4,217,646 | 8/1980 | Caltagirone et al. | 364/493 |

Primary Examiner—Errol A. Krass
Assistant Examiner—Gary Chin
Attorney, Agent, or Firm—Christensen, O'Connor, Johnson & Kindness

[57] ABSTRACT

A programmable electronic real-time load controller includes: a plurality of load control circuits, each being adapted to be interconnected with a load; a hardware clock; and, a programmed data processor for responding to real-time information from the hardware clock to effect control of the status of each load control circuit in accordance with a predetermined time schedule that has been entered into the data processor. The data processor includes: a CPU; a program memory; an event memory; and a plurality of ports which permit a plurality of devices, including a keyboard, a plurality of displays, and the hardware clock, to interchange information with the data processor. The event memory includes a plurality of event memory locations for storing one or more control events and corresponding event times for each load. The CPU is operative: to enter control events and corresponding event times, upon actuation of the keyboard, into the event memory; to obtain real-time information from the hardware clock; to address and search the event memory locations to effect comparison, for each load, of the event times therein with the real-time information; and, to control the status of each load control circuit in accordance with that one of the control events whose corresponding event time occurs at or immediately preceding the time represented by the real-time information.

25 Claims, 22 Drawing Figures

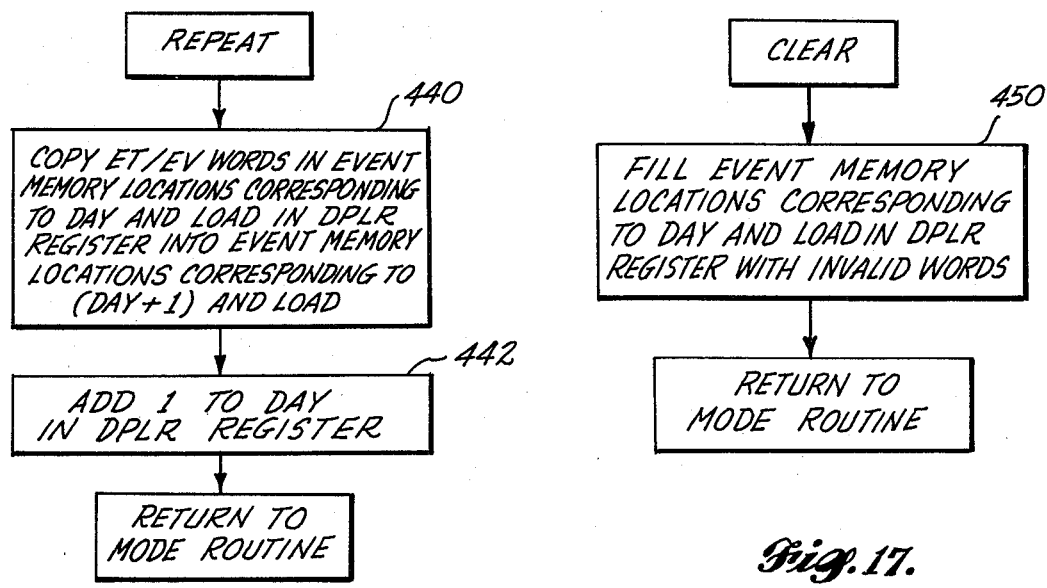
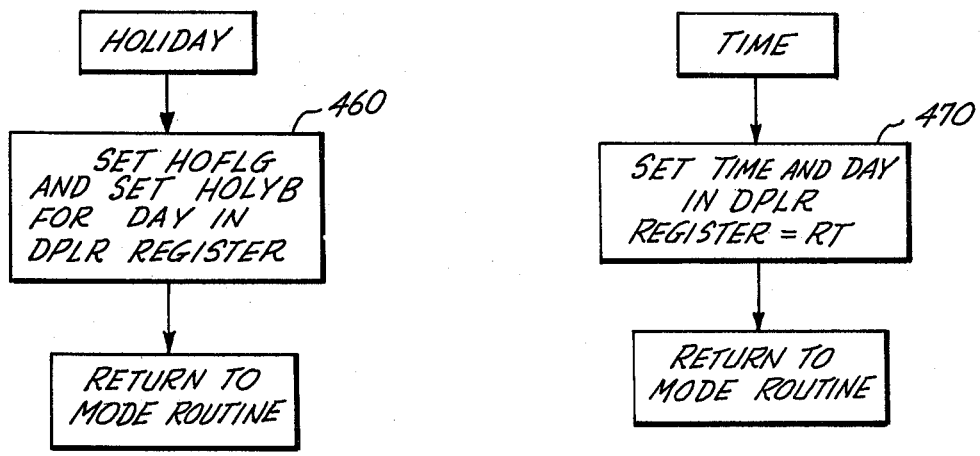
Fig. 16.  Fig. 17.  Fig. 18.  Fig. 19.

PROGRAMMABLE ELECTRONIC REAL-TIME LOAD CONTROLLER

FIELD OF THE INVENTION

This invention generally relates to apparatus for controlling the energization states of a plurality of electrical load circuits, and, more particularly, to such an apparatus in which such energization states are controlled in real-time in accordance with a predetermined time schedule.

BACKGROUND OF THE INVENTION

There has long been a need, particularly in industrial and commercial facilities, for a device which functions to turn on and off one or more electrical load circuits at the facility at preselected times so as to conform the "on time" of the load circuit with the periods during which energization of the loads associated therewith is required. For example, it may be desired to turn on the air conditioning equipment at the facility about an hour before the beginning of the normal working day, and to turn off the air conditioning equipment about an hour after the end of the normal working day. As another example, it may be desired to limit energy consumption at the facility by turning off certain load circuits during times that energization of the loads associated therewith is not essential.

In the prior art, this need has been met for the most part by electro-mechanical timers which include an electrical clock, typically powered from a source of alternating current voltage, and a plurality of manually positionable switches which are assembled so as to be actuated by a cam, rotated by the clock, whose position represents real-time. Such timers usually are adapted only for the control of a single load circuit, and are capable of providing only a limited number of changes in the energization states of the load circuit during a single 24-hour period. The switches are difficult to position, and their physical construction does not permit a precise selection of on-off times. Further, the control function afforded by such timers is simply to turn the load circuit on or off, and more sophisticated control functions, such as duty-cycle control of the load circuit, are not available. Finally, a power outage which causes a disruption in the source of alternating current voltage causes the timer to lose synchronism with real time, so that the position of the cam therein must be manually readjustable after restoration of power.

Another type of device typically used in the prior art is that known as the repetitive cycle controller, which functions to provide control of the energization states of one or more load circuits in accordance with a predetermined duty cycle, that is, each load circuit is repetitively turned on and off for predetermined periods of time. Such repetitive cycle controllers, however, are difficult to use to effect control of the energization states of a load circuit in accordance with a predetermined time schedule.

It is therefore an object of this invention to provide an improved apparatus for controlling the energization states of a plurality of electrical load circuits in accordance with a predetermined time schedule.

It is a further object of this invention to provide such an apparatus which takes the form of a programmable electronic real-time load controller which is operable to control the energization states of the load circuits in real time and in accordance with a predetermined time schedule that has been programmed into the controller by a user.

It is another object of this invention to provide such an apparatus which allows a user to flexibly program the predetermined time schedule by selecting, in advance, a number of control events and corresponding event times for each of a plurality of load circuits and for each of a plurality of days in a week.

It is yet another object of this invention to provide such an apparatus which allows the user to select a control event which causes a particular load circuit to be turned on, to be turned off, or to be controlled in accordance with a predetermined duty-cycle control function.

It is still another object of this invention to provide such an apparatus which allows the user to select, in advance, a holiday schedule for each load circuit, and to designate in advance a particular day of a week as a holiday, whereupon the apparatus functions to control the energization states of the load circuits during the designated day in real-time in accordance with the holiday schedule.

It is an object of this invention to provide such an apparatus which permits the predetermined time schedule to be overridden by an external device, or, by the user.

It is an object of this invention to provide such an apparatus in which the operation of the apparatus is maintained in synchronism with real-time despite the loss of ac power to the apparatus.

It is an object of this invention to provide such an apparatus which can be implemented in an easy and inexpensive manner by the use of readily available, integrated circuit, microprocessor components.

SUMMARY OF THE INVENTION

Briefly, these objects and others that will be apparent to those of ordinary skill in the art are achieved in an electronic controller for controlling the energization states of each of a plurality of electrical loads in real time. The controller comprises: a plurality of load control circuits, each load control circuit being adapted to be interconnected with a load, and having a load-on state when its load is to be on, and a load-off state when its load is to be off; clock means for accumulating real-time information; and, a data processor, operating under control of a program, for responding to real-time information obtained from the clock means to effect control of the load-on and the load-off states of each of the plurality of load control circuits in accordance with a predetermined time schedule.

The data processor includes: an event memory for storing a plurality of load groups of information, each load group being uniquely associated with one of the plurality of electrical loads and comprising one or more control events and an event time corresponding to each control event, with each control event in a load group representing a period of time during each predetermined control interval subsequent to its corresponding event time that its associated load is to be on; a program memory storing a set of program instruction; and, a processing means responsive to the set of program instructions stored in the program memory for: entering the control events and corresponding event times for each load into the associated load group in the event memory; obtaining real-time information from the clock means; for each load, addressing and searching the associated load group in the event memory to effect comparison of the event times therein with the real-time information obtained from the clock means; and, placing the load control circuit for each load in its load-on state or its load-off state in accordance with that one of the control events in the associated load group whose corresponding event time is at or immediately precedes the time represented by the real-time information obtained from the clock means.

BRIEF DESCRIPTION OF THE DRAWINGS

The invention can best be understood by reference to the following portion of the specification, taken in conjunction with the accompanying drawings, in which:

FIG. 16 is a flow chart of the program steps undertaken by the microprocessor in a REPEAT subroutine;

FIG. 17 is a flow chart of the program steps undertaken by the microprocessor in a CLEAR subroutine;

FIG. 18 is a flow chart of the program steps undertaken by the microprocessor in a HOLIDAY subroutine;

FIG. 19 is a flow chart of the program steps undertaken by the microprocessor in a TIME subroutine;

DESCRIPTION OF A PREFERRED EMBODIMENT

Figure 1:
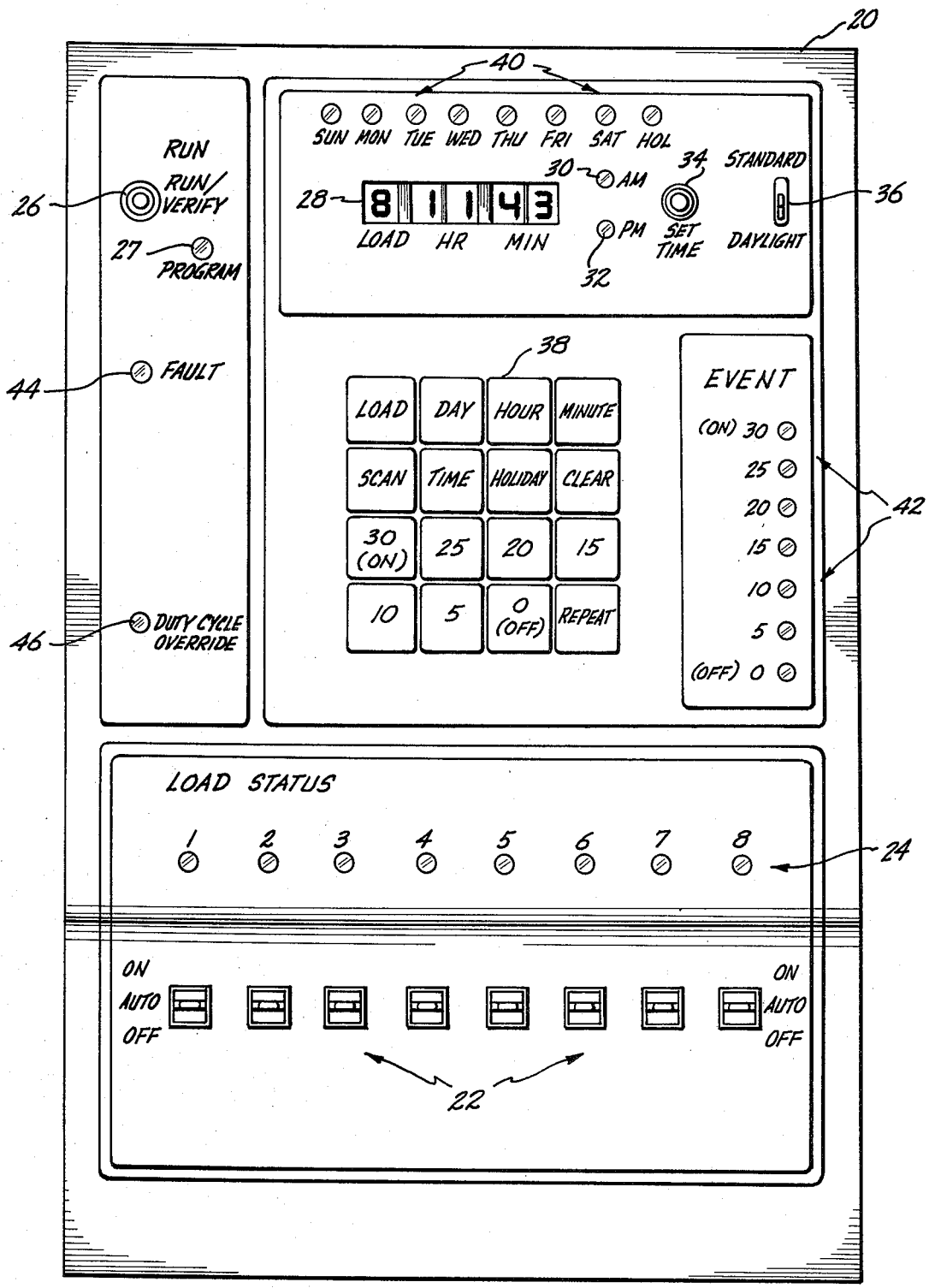
FIG. 1 is a pictorial view of a front panel of a preferred embodiment of the apparatus.

With reference to FIG. 1, a preferred embodiment of the programmable electronic real-time load controller includes a housing 20 on whose top panel are located a plurality of controls and displays that permit a user to transmit information to and receive information from a data processor, preferably a microprocessor and related components, located within the housing 20, and that also permit the user to override the control actions being undertaken by the controller if desired.

A plurality of load control switches 22 (one for each load circuit to be controlled, e.g. eight) are provided, with each load control switch 22 having three positions respectively labelled ON, AUTO and OFF. As described hereinafter with reference to FIGS. 2 and 3, each load control switch 22 forms part of a load control circuit which includes a load relay having normally-open, SPST contacts adapted for series interconnection with a load circuit (hereinafter referred to for convenience as a "load"). When each load control switch 22 is in its ON or its OFF position, its associated load is respectively turned on or turned off, irrespective of the operation of the microprocessor within the controller. When each load control switch 22 is in its AUTO position, the energization state of its associated load is controlled by the microprocessor through control of the energization state of the corresponding load relay.

A plurality of LEDs 24 labelled LOAD STATUS are provided, one for each load, with each LED 24 being lit when its associated load is turned on, and being extinguished when its associated load is turned off.

Figure 2:
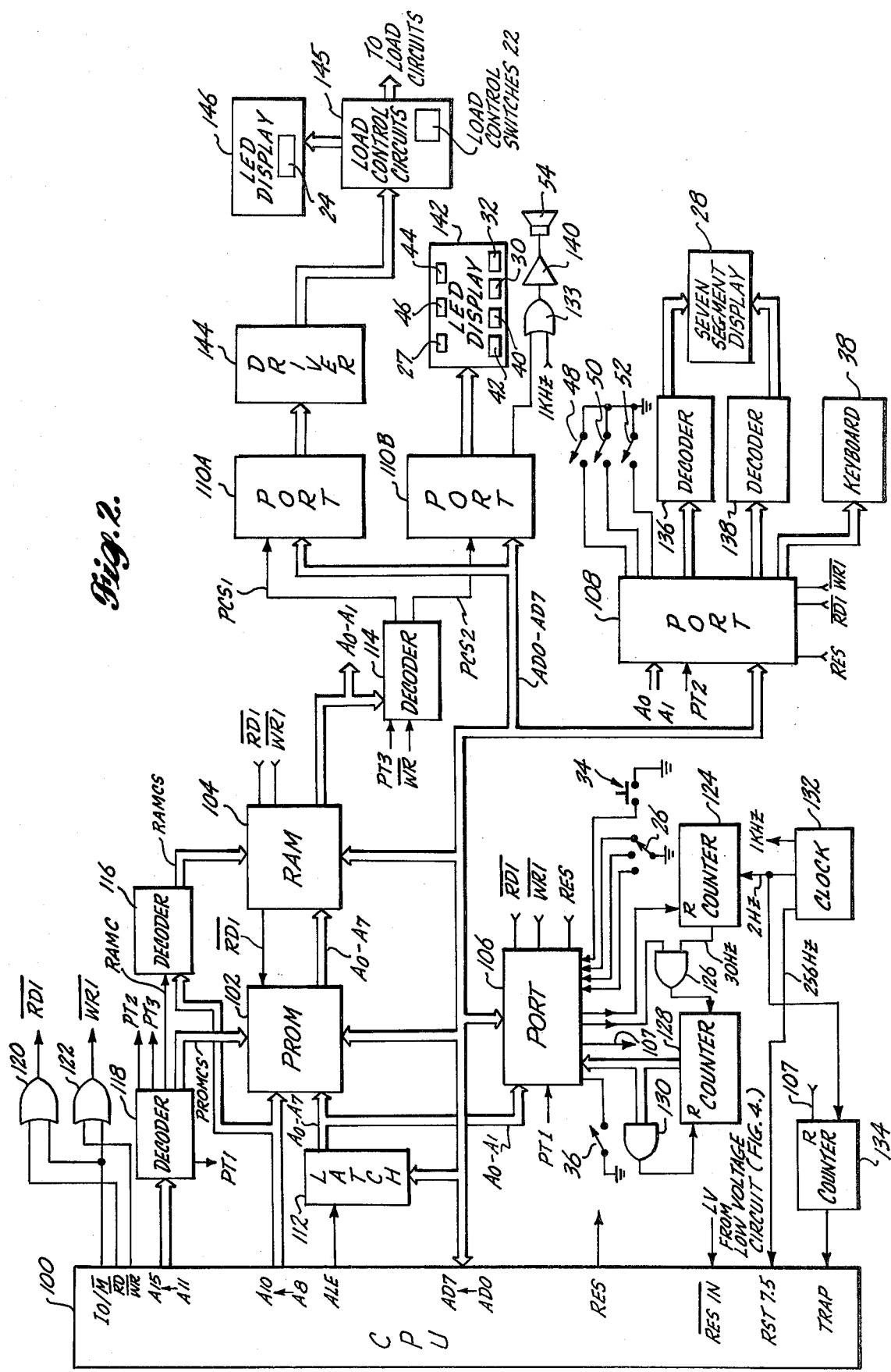
FIG. 2 is an electrical block diagram of the preferred embodiment, including a microprocessor.

The microprocessor has three modes of operation, denominated "program," "run/verify," and "run" which can be selected by the user through the positioning of a mode switch 26 to respective PROGRAM, RUN/VERIFY or RUN positions. When the microprocessor is in the program mode of operation, the load relays are maintained in the energization states established prior to the time that the microprocessor entered the program mode of operation, and the user is permitted to enter a predetermined time schedule into the microprocessor for load control, or to alter any schedule that has been previously entered. When the microprocessor is in either the run/verify or the run modes of operation, the energization states of the load relays are controlled by the microprocessor in accordance with the predetermined time schedule, but the user is not permitted to alter the predetermined time schedule. To prevent inadvertent changes to the schedule, the microprocessor will enter the program mode of operation only if the user places the mode switch 26 to its PROGRAM position within a predetermined period of time, e.g., five seconds, after the user has actuated a "hidden" program enable switch 48 (FIG. 2). When the microprocessor is in the program mode of operation, an LED 27 is lit.

In order to prevent certain information to the user regarding the operation of the controller, there is provided a display 28, an LED 30 labelled AM, an LED 32 labelled PM, and a plurality of LEDs 40 respectively labelled SUN, MON, TUE, WED, THU, FRI, SAT and HOL. The display 28 has a plurality of seven-segment, alpha-numeric character displays including a LOAD character display (which displays a number identifying a load, e.g., "1" to "8"), two HR character displays (tens and units), and two MIN character displays (tens and units). As described hereinafter, the controller includes a hardware clock which provides real-time information to the microprocessor. In the run mode, the microprocessor normally causes the LOAD character display to be blanked, and the remaining character displays and LEDs 30, 32 and 40 to display real time. In the program mode of operation, the time within the hardware clock may be adjusted upon actuation of a switch 34 labelled SET TIME. In all three modes of operation, the real-time information used by the microprocessor for load control may be advanced by one hour from the time in the hardware clock in accordance with the setting of a switch 36 labelled STANDARD/DAYLIGHT.

A keyboard 38, which is enabled only when the microprocessor is in either the run/verify or the program mode, permits the user to enter a schedule for load control into the microprocessor, or to alter any previously-entered schedule, and also permits the user to obtain a display of the schedule and of real time. Included in the keyboard 38 are a plurality of keys labelled LOAD, DAY, HOUR, MINUTE, SCAN, TIME, HOLIDAY, CLEAR, 30(ON), 25, 20, 15, 10, 5, 0(OFF) and REPEAT.

At this point, it should be noted that the controller permits the scheduling of a plurality of control events, or, changes in the load control function being effected by the controller, for each load for each day of a week, plus a holiday schedule for each load. Each control event has associated therewith a unique event time. A control interval, e.g., thirty minutes, is established, and each control event is defined as the number of minutes during each successive control interval subsequent to the event time that a load will be turned on.

In the preferred embodiment, three load control functions are provided, these being "on," "off" and "duty-cycle." To schedule a control event representing either the "on" or "off" control functions, the user selects the desired load and event time by actuation of the appropriate keys in keyboard 38, and actuates either the 30(ON) or 0(OFF) keys. To schedule a control event having a "duty-cycle" control function, the user selects the desired load and event time by actuation of the appropriate keys in keyboard 38, and actuates one of the 25, 20, 15, 10, or 5 keys.

When either the "on" or "off" control functions have been so scheduled, the microprocessor, when placed in the run or run/verify modes, will maintain the selected load either on or off, from a time in real time corresponding to the event time of the control event to a time in real time corresponding to a subsequent event time of another control event. When a "duty-cycle" control function has been scheduled, the microprocessor will maintain the selected load on for a selected portion of each subsequent control interval in real time from the event time of the control event to a subsequent event time of another control event. For example, if the 25 key has been actuated, the microprocessor will maintain the selected load on for the first twenty-five minutes of each successive thirty minute interval in real time subsequent to the event time.

While the microprocessor is in the program or run/verify modes, display of a selected load, day, and event time is made by the display 28 and LEDs 30, 32, and 40, and display of a selected event is made by a plurality of LEDs 42 whose labels correspond to those of the event keys (e.g., 30(ON), 25, 20, 15, 10, 5 0(OFF)) in keyboard 38.

In order to schedule control events, the user first places the microprocessor into the program mode as previously described. The user then actuates: the LOAD key until the desired load number appears in display 28; the DAY key until the LED 40 corresponding to the desired day is lit; and, the HOUR and MINUTE keys until the desired event time is displayed by display 28 and LEDs 30, 32. The desired control event is then entered into an event memory within the microprocessor by actuation of the corresponding event key, and is acknowledged by the microprocessor by the lighting of the corresponding LED 42. After entry of all the desired control events for a given day and for a given load, scheduling of control events may be effected for another day after actuation of the DAY key until the LED 40 corresponding to the desired day is lit. Alternatively, the schedule of control events for a given load and for a given day may be repeated for subsequent days, one at a time, by actuation of the REPEAT key in keyboard 38. After all control events have been scheduled for a given load and for an entire week, the scheduling process is repeated for the remaining loads in a manner identical to that previously described.

The microprocessor also permits a separate holiday schedule to be established for each load, with the holiday schedule having any sequence of control events that may be desirable. To enter the holiday schedule, the DAY key is actuated while the microprocessor is in the program mode until the LED 40 labelled HOL is lit. The holiday schedule for each load is then entered in a manner identical to that previously described.

Any previously-entered schedule can be altered by rescheduling control events and event times when the microprocessor is in the program mode. Also, the schedule for a given load and for a given day (including a holiday) may be deleted by actuation of the LOAD and DAY keys until the desired load number and day (including holiday) are displayed, and by subsequent actuation of the CLEAR key.

In order to obtain display of real-time information when the microprocessor is in either the run/verify or the program modes, the TIME switch may be actuated.

As previously described, the time within the hardware clock may also be changed through actuation of the SET TIME switch 34. Specifically, the DAY, HOUR and MINUTE keys are actuated until a desired time is displayed. Subsequent actuation of the SET TIME switch 34 will cause the microprocessor to change the time within the hardware clock to the time as displayed.

While the microprocessor is in either the run/verify or the program modes, the user may obtain a display of the schedule for each load and for each day (including a holiday). To obtain such a display, the user actuates the LOAD and DAY keys until the desired load number and day are displayed. Actuation of the SCAN key then causes the microprocessor to display the scheduled event times and control events, in a sequence of successive event times, through display 28, LEDs 30 and 32, and LEDs 42.

Let it be assumed that a schedule for load control has been entered (or altered), and that the microprocessor is now placed in its run/verify mode (by appropriate positioning of the mode switch 26). Thereupon, the LOAD character display in display 28 is blanked, and the remaining character displays in display 28, and LEDs 30, 32, and 40, display real-time information obtained from the hardware clock. In effecting load control, the microprocessor continuously compares real-time information obtained from the hardware clock with the schedule, and effects the control functions represented by the control events in the schedule at the times in real time corresponding to the event times in the schedule. If no control events have been scheduled for a given load for the day in real-time, the microprocessor automatically scans back through the previous six days in the schedule and controls the load in accordance with the control function represented by the last-entered control event. If no control events have been entered in the schedule for the load, the load is maintained off.

To avoid a large inrush of power in the case where the schedule calls for more than one load to be turned on at the time that the microprocessor is placed in either the run or run/verify modes, the microprocessor turns on the loads in a predetermined sequence and at predetermined intervals.

As previously described, the schedule cannot be entered or altered when the microprocessor is in the run or run/verify modes. However, when the microprocessor is in the run/verify mode, one or more of the days in any given week in real-time can be selected as a holiday, whereupon the microprocessor follows the holiday schedule for all loads upon occurrence of that day or days in real-time. To accomplish this selection, the DAY key is actuated until LED 40 corresponding to the desired day is lit, and the HOLIDAY key is actuated. When the thus-selected day occurs in real time, the LED 40 corresponding to the thus-selected day and the LED 40 labelled HOL will be lit, and the microprocessor will control all loads in accordance with the holiday schedule. After occurrence of the thus-selected day in real-time, the microprocessor will adhere to the regular schedule upon the next occurrence of that day in real-time, unless the day is again selected as a holiday.

An LED 44 labelled FAULT and an audible alarm 54 (FIG. 2) are also provided. When a proper keyboard entry is made by the user, the audible alarm 54 is actuated for a short period of time. When an improper keyboard entry is attempted, however, the FAULT LED is lit for a short period of time and the entry is not accepted by the microprocessor. An internal check is also made by the microprocessor of its event memory. If an event memory malfunction is detected, the microprocessor causes the FAULT LED 44 and the audible alarm 54 to be energized, whereupon the user must return the microprocessor to its program mode of operation and reschedule all control events before the microprocessor can be returned to its run or run/verify modes of operation.

Provision is also made for allowing an external device to override the operation of the microprocessor in certain circumstances. Specifically, a set of terminals is provided to which may be connected a set of external contacts 50 (FIG. 2). The contacts 50, referred to hereinafter as the load 1 enable switch 50, must be closed in order for the microprocessor to control load number 1 in accordance with the schedule entered therein. For example, switch 50 may comprise the contacts of a photocell, which open during daylight, and load number 1 may comprise a lighting rod. In such a case, the microprocessor will be enabled to turn on or turn off load number 1 only during non-daylight hours, and load number 1 will otherwise be maintained off.

There is also provided a set of terminals adapted to be connected to a set of contacts 52 (FIG. 2) which are hereinafter referred to as the duty-cycle override switch 52. Whenever switch 52 is closed, all loads whose current control events represent a "duty-cycle" control function are maintained on, and a LED 46 labelled DUTY-CYCLE OVERRIDE is lit. For example, switch 52 may comprise the contacts of a thermostat which close when a set temperature is reached. The microprocessor may accordingly function to provide duty-cycle control functions for loads such as cooling equipment only until the cooling equipment has brought the facility's temperature to that set in the thermostat, thereby allowing more efficient cooling.

With reference now to FIG. 2, the microprocessor in the preferred embodiment of the controller has a plurality of components including a CPU (Central Processing Unit) 100, a PROM (Programmable Read Only Memory) 102, a RAM (Randon Access Memory) 104, a first port 106, a second port 108, and a third port divided into ports 110A, 110B. The foregoing components may comprise one or more, commerically-available integrated circuit chips, of which the following are representative:

TABLE I

| Component | Designation |
|---|---|
| CPU 100 | Intel 8085 Micropressor |
| PROM 102 | Two Intel 2716 16K (2KX8) UV Erasable PROM |
| RAM 104 | Ten Intel M5101L-4 256×4-bit Static CMOS RAMs |
| Ports 106, 108 | Intel 8255 Programmable Peripheral Interface |
| Port 110A | 74LS374 8-bit Latch (available from a number of manufacturers) |
| Port 110B | Three 74LS374 |

A low address/data bus, comprising leads AD-0–AD7, interconnects corresponding terminals of CPU 100, PROM 102, RAM 104, ports 106, 108, 110A, 110B, and a latch 112. A lead ALE interconnects corresponding terminals of CPU 100 and latch 112. A plurality of leads A0–A7 interconnect corresponding output terminals of latch 112 with corresponding terminals of PROM 102 and RAM 104. In addition, leads A0–A1 interconnect latch 112 with ports 106, 108 and with a decoder 114.

A first group of high address terminals of CPU 100 are interconnected with PROM 102 and with a decoder 116 by leads A8–A10. A second group of high address terminals of CPU 100 are interconnected with a decoder 118 by leads A11–A15.

Decoder 118 has a plurality of output terminals which are interconnected with port 106, port 108, decoder 114, and decoder 116 by respective leads PT1, PT2, PT3 and RAMC. Decoder 118 also has a plurality of output terminals which are interconnected with the integrated circuit chips within PROM 102 by corresponding leads PROMCS. Likewise, decoder 116 has a plurality of output terminals which are interconnected with the integrated circuit chips within RAM 104 by corresponding leads RAMCS. Decoder 114 has a plurality of output terminals which are interconnected with port 110A and port 110B by respective leads PSC1 and PCS2.

Terminals IO/$\overline{\text{M}}$ and $\overline{\text{RD}}$ of CPU 100 are connected to corresponding inputs of an OR gate 120, and terminals IO/$\overline{\text{M}}$ and $\overline{\text{WR}}$ of CPU 100 are connected to corresponding inputs of an OR gate 122. The output of OR gate 120 is connected by a lead $\overline{\text{RD1}}$ to PROM 102, RAM 104, port 106 and port 108, and the output of OR gate 122 is connected by a lead $\overline{WR1}$ to RAM 104, port 106, port 108 and decoder 114. Finally, a RES terminal of CPU 100 is interconnected with corresponding terminals of ports 106, 108.

The foregoing components, and their interconnections, form a largely conventional microprocessor, in which PROM 102 contains a program memory comprising a set of program instructions for various routines and subroutines which are described hereinafter with reference to FIGS. 7-21, and in which RAM 104 contains a scratch pad memory which is organized as described hereinafter with reference to FIG. 5, and an event memory which is organized as described hereinafter with reference to FIG. 6. Ports 106 and 108 function as input/output ports, whereas ports 110A, 110B function as output ports.

Within each routine or subroutine, the set of program instructions in PROM 102 are addressed and executed by CPU 100 in a predetermined sequence, established by a program counter within CPU 100. For each program instruction so addressed, CPU 100 undertakes an instruction cycle, with each instruction cycle including a plurality of machine cycles. The machine cycles permit CPU 100 to retrieve an instruction from PROM 102 and to execute the instruction by the addressing and transmission of data to and from CPU 100, RAM 104 and ports 106, 108 and 110A, 110B. Within each instruction cycle, addresses or data are transmitted on leads AD0-AD7. When an address is being transmitted by CPU 100 on leads AD0-AD7, a signal is provided on lead ALE therefrom which causes latch 112 to store therein the address, and to present the address thus stored on leads A0-A7. At all other times, leads AD0-AD7 are used for the transmission of data. The address on leads A0-A7, together with further address information on leads A8-A10, is used to signify a memory location within the chips in PROM 102. Likewise, the address on leads A0-A7 is used to signify a memory location within the chips in RAM 104. The address on leads A0-A1, plus address information on leads AD0-AD7 is used to signify that ports 106 and 108 should connect one of their input or output terminals, to be described hereinafter, with leads AD0-AD7 for the transmission or reception of data. Likewise, address information on leads AD0-AD7 is used to signify that ports 110A, 110B should connect one or more of their output terminals, to be described hereinafter, to leads AD0-AD7 for the reception of data.

In order to signify which of the thus-addressed components of the microprocessor is to be interconnected with the leads AD0-AD7 for the transmission or reception of data, CPU 100 provides signals on leads A11-A15 to decoder 118, which responsively provides select signals on leads PT1, PT2, PT3, or PROMCS to respectively enable port 106, port 108, ports 110A and 110B, or one of the chips within PROM 102. Decoder 118 is also responsive to the signals on leads A11-A15 from CPU 100, together with the signals on leads A8-A10 therefrom, to provide chip select signals on leads RAMCS to respectively enable one of the chips within RAM 104. Likewise, decoder 114 is responsive to signals on leads A0-A1, and to the chip select signal on lead PT3, to provide chip select signals on leads PCS1 or PCS2 to respectively enable either port 110A or port 110B.

Actual data transmission on leads AD0-AD7, however, is not permitted until times during each instruction cycle as determined by CPU 100 and as signified by signals on terminals IO/$\overline{M}$, $\overline{RD}$ and $\overline{WR}$. By combining of these signals in OR gates 120, 122, the signals on leads $\overline{RD1}$ and $\overline{WR1}$ permits all ports to be treated as if they were memory locations (memory-mapped I/O). Upon provision of a signal on lead $\overline{RD1}$, the data in an addressed memory location in an enabled chip within PROM 102 or RAM 104 is placed on the leads AD0-AD7. Likewise, the data represented by signals on any addressed input terminal in ports 106, 108, when enabled, is placed on leads AD0-AD7. Upon the provision of a signal on lead WR1, any data on leads AD0-AD7 is written into an addressed memory location in an enabled chip within RAM 104, or, supplied to any addressed and enabled output terminal in ports 106, 108, 110A, 110B.

Finally, various buffers within ports 106, 108 110A, 110B, that are used for temporary storage of data being received from or transmitted to one of the input or output terminals thereof, are reset or cleared upon the provision of a signal on lead RES from CPU 100 to ports 106, 108, and by the provision of suitable data on leads AD0-AD7 to ports 110A, 110B.

Further details regarding the structure and operation of the microprocessor may be found in the "Intel Component Data Catalog 1978" and in the "MCS-85 User's Manual", copyright 1977, Intel Corporation, both of which are expressly incorporated by reference herein.

A first group of input terminals of port 106 is respectively connected to SET TIME switch 34 and to respective terminals of the mode switch 26, in order to determine the actuation of SET TIME switch 34 and the positioning of mode switch 26 to either the RUN, RUN/VERIFY, or PROGRAM positions. A first output terminal of port 106 is connected to the reset (R) input of a counter 124, and a second output terminal of port 106 is connected to a first input of an OR gate 126 whose other input is connected to the output of counter 124. The output of OR gate 126 is connected to the signal input of a counter 128 which has a plurality of output terminals that are interconnected with a second group of input terminals of port 106 and with corresponding inputs of an AND gate 130. The output of AND gate 130 is connected to the reset (R) input of input counter 128. Another input terminal of port 106 is interconnected with STANDARD/DAYLIGHT switch 36 in order to determine the positioning thereof to either the STANDARD or DAYLIGHT positions.

A clock 132 provides a plurality of clock signals comprising: a first clock signal (e.g., at a frequency of 1 kHz) which is connected by an appropriate lead to a first input of an AND gate 133 to be described hereinafter; a second clock signal (e.g., at a frequency of 2 Hz) which is applied to the signal inputs of counter 124 and a counter 134; and, a third clock signal (e.g., at a frequency of 256 Hz) which is connected by an appropriate lead to an RST 7.5 (interrupt) input of CPU 100. A third output terminal of port 106 is connected by a lead 107 to a reset (R) input of counter 134, and the output of counter 134 is connected to a TRAP input of CPU 100.

Clock 132, counter 124, gate 126, counter 128, and gate 130 comprise the hardware clock which accumulates real-time information used by the microprocessor. Clock 132 preferably comprises a crystal-stabilized oscillator and a counter which divides a signal from the oscillator to provide the aforementioned clock signals. Counter 124 preferably comprises a counter which functions to divide the frequency of the second clock signal from clock 132 to provide an output signal (e.g., at a frequency of 0.033 Hz) to gate 126. Normally, gate 126 functions to pass the output signal from counter 124 to the signal input of counter 128 which is responsive to the output signal from counter 124 so as to accumulate a count representing the number of minutes that have transpired, in real-time, during a week. The count within counter 128 is coupled to the microprocessor through the output terminals of counter 128 and the second group of input terminals of port 106. When counter 128 has accumulated a count representing the total number of minutes in a week, gate 130 provides an output signal to reset counter 128, whereupon counter 128 again begins to accumulate a count representative of the number of minutes, in real-time, during a subsequent week.

As previously noted, the microprocessor is capable of setting the time (or count) within the hardware clock to a desired time (or count) upon actuation of the SET TIME switch 34. To accomplish this function, the microprocessor provides a signal on the first output terminal of port 106 to reset counter 124, and provides a high frequency signal on the second output terminal of port 106 which is gated through gate 126 to advance the count within counter 128 until that count, is at the desired time.

Provision is also made for monitoring the timing of the execution of program instructions by CPU 100. To accomplish this function, the counter 134 is set to overflow, and to accordingly provide an output signal, after an interval determined by a predetermined number of pulses in the second output signal from clock 132. When counter 134 overflows, the output signal therefrom at the TRAP input of CPU 100 causes CPU 100 to reset its program counter and to reinitialize its operations. However, if CPU 100 is executing program instructions in a timely manner, a signal is provided on the third output terminal of port 106 at periodic intervals, each of which is less than the overflow interval of counter 134, which causes counter 134 to be reset without overflowing.

The third clock signal from clock 132 causes CPU 100 to undertake an INTERRUPT subroutine, to be described hereinafter, in which the displays of the microprocessor are refreshed and in which certain internal timers in RAM 104 are decremented.

A first group of input and output terminals of port 108 is interconnected with keyboard 38 and is used to scan and detect key actuations therein in a conventional manner. Second and third groups of output terminals of port 108 are interconnected by decoders 136, 138 with scan and display inputs of the character displays within display 28, with decoders 136 and 138 functioning in a conventional manner to provide demultiplexing and subsequent display of data obtained from port 108. The remaining input terminals of port 108 are interconnected, respectively, with the program enable switch 48, with the load 1 enable switch 50, and with the duty-cycle override switch 52, in order to detect actuation of those switches.

Port 110B has a first output terminal which is connected to a second input of gate 133. The presence of a signal on the first output terminal of port 110B causes the first clock signal (at 1 kHz) from clock 132 to be gated through an amplifier 140 to cause actuation of the audible alarm 54. Port 110B also has a group of output terminals which are interconnected with a conventional LED display 142 including the "PROGRAM" LED 27, the AM LED 30, the PM LED 32, the LEDs 40, the LEDs 42, the FAULT LED 44, and the DUTY-CYCLE OVERRIDE LED 46, whereupon a signal on any one of the output terminals of port 110B causes the corresponding LED to be lit.

Port 110A has a plurality of output terminals which are interconnected by means of a driver circuit 144 with a plurality of load control circuits 145, each of which includes one of the load control switches 22 and which is described in more detail hereinafter with reference to FIG. 3. Each of the load relays within the plurality of load control circuits 145 is adapted to be interconnected with an electrical load circuit, and each load control circuit 145 is interconnected with a corresponding one of the LEDs 24 forming part of a conventional LED display 146.

Figure 3:
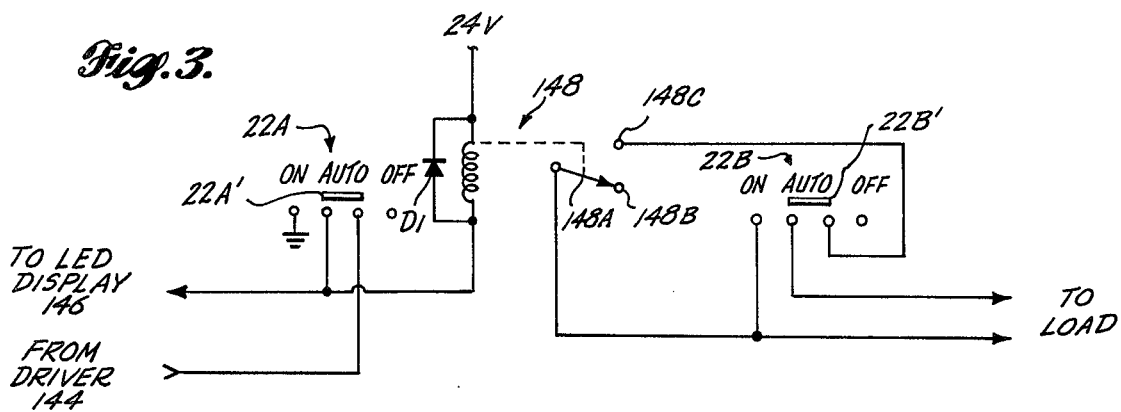
FIG. 3 is an electrical schematic diagram of a load relay circuit illustrated more generally in FIG. 2.

With reference now to FIG. 3, each load control circuit 145 includes the load control switch 22 which is divided into first and second, ganged sections 22A, 22B. Each switch section 22A, 22B includes a plurality of stationary contacts, of which the left hand contact is labelled ON, the middle two contacts are labelled AUTO, and the right hand contact is labelled OFF (corresponding to the labelled positions illustrated in FIG. 1). Switch section 22A is provided with a movable contact member 22A', and switch section 22B is provided with a movable contact member 22B', each of which is adapted to bridge two of the stationary contacts thereof. The ON stationary contact of switch section 22A is connected to ground, and the right-hand AUTO stationary contact thereof is connected to a corresponding output terminal of the driver circuit 144. The left-hand AUTO stationary contact of switch section 22A is connected to a corresponding LED 24 in LED display 146, and to one side of the coil of a load relay 148 whose other side is connected to a source of supply voltage by lead 24V. A diode D1 connected in shunt with the coil of load relay 148 provides reverse-voltage protection for the output transistor in the corresponding driver circuit 144. A movable contact arm 148A of load relay 148 is connected to a first lead going to the associated load circuit, and to the ON stationary contact of switch section 22B. Upon de-energization of the load relay 148, movable contact arm 148A engages stationary contact 148B thereof, which is unconnected. Upon energization of load relay 148, movable contact arm 148A is in engagement with stationary contact 148C thereof, which is connected to the right-hand AUTO stationary contact in switch section 22B. The left-hand AUTO stationary contact in switch section 22B is connected to a second lead going to the load circuit.

With the movable contact members 22A', 22B' in the position illustrated in FIG. 3, the energization state of the load relay 148 is under control of the microprocessor. When the microprocessor is maintaining the load off, driver circuit 144 provides a high impedance level on its output which, when coupled through switch section 22A, causes load relay 148 to be de-energized. As a result, the leads going to the load circuit are disconnected from each other, inasmuch as movable contact arm 148 is in engagement with stationary contact 148B thereof. When the microprocessor is maintaining the load on, driver circuit 144 provides a low level signal which, when coupled through switch section 22A, permits load relay 148 to be energized from the supply voltage appearing on lead 24V. The low level signal from driver circuit 144 is also coupled through switch section 22A to the corresponding LED 24 in LED display 146 to provide a current path thereto. When load relay 148 is energized, a connection is made between the leads going to the load circuit, through switch section 22B and contacts 148C, 148A.

As can be noted, no connection is made to the OFF stationary contacts of switch sections 22A, 22B. Accordingly, when the movable contact members 22A', 22B' are moved to bridge the OFF and right-hand AUTO stationary contacts of switch sections 22A, 22B, the connections between the leads going to the load circuit and between the driver circuit 144 and the LED display 146 are broken. Accordingly, the associated load circuit is maintained off, and the associated LED 24 is extinguished, notwithstanding the nature of the signal from driver circuit 144. Likewise, if the movable contact members 22A', 22B' are moved so as to bridge the ON and left-hand AUTO stationary contacts of switch sections 22A, 22B, a connection is made between the leads going to the load circuit, and between the associated LED 24 in LED display 146 and a low level signal (e.g., ground), whereby the associated load circuit is maintained on and the associated LED 24 is lit, notwithstanding the nature of the signal from driver circuit 144.

Figure 4:
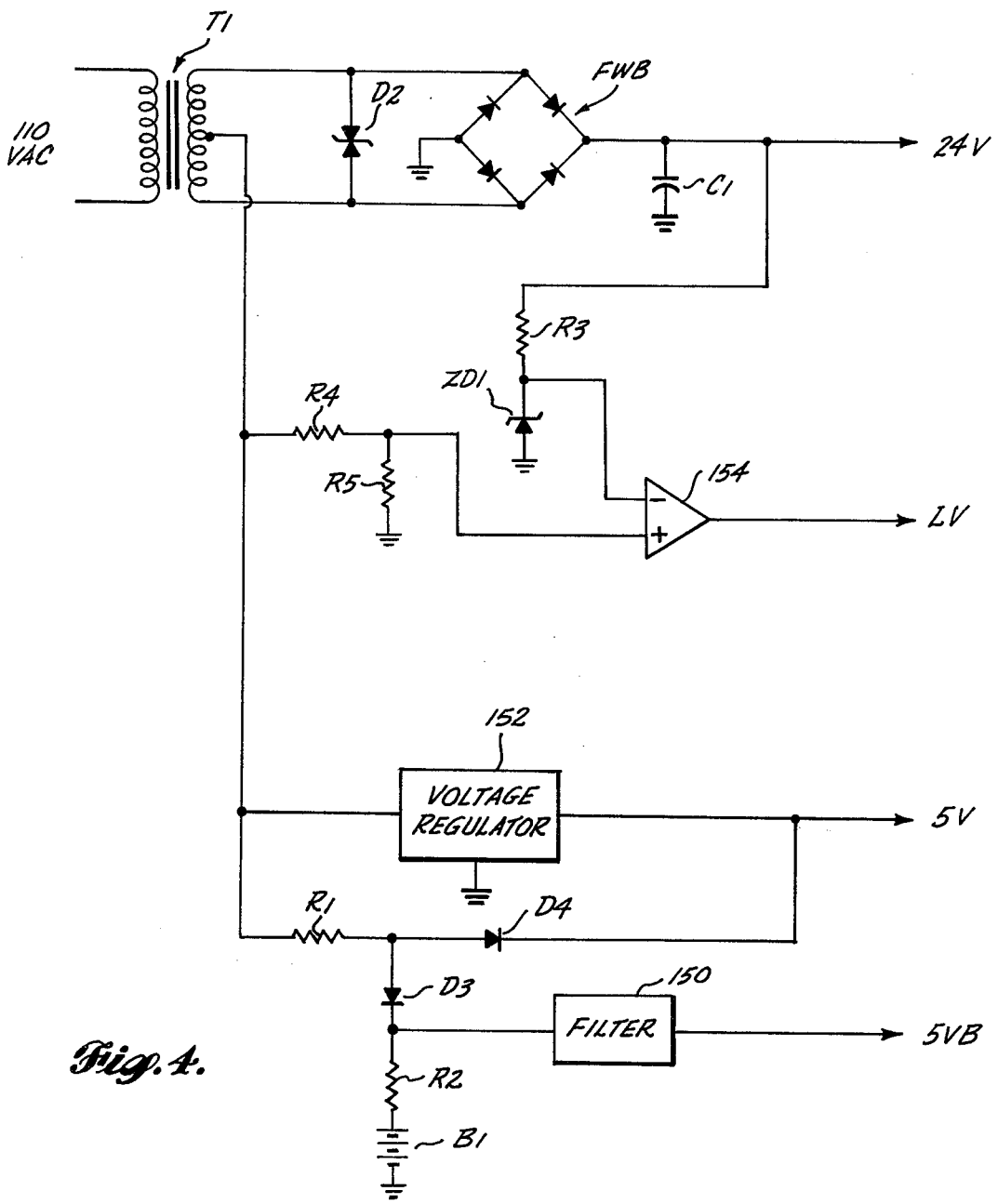
FIG. 4 is an electrical schematic diagram of a power supply and low voltage detection circuit usable with the apparatus of FIG. 2.

With reference now to FIG. 4, a power supply capable of providing appropriate dc supply voltages for the components of the controller from a source of alternating current, and also capable of detecting a low voltage condition in the source of alternating current, is illustrated. The source of alternating current (nominally at 110 vac) is connected across the primary winding of a transformer T1. The resultant ac voltage appearing across a center-tapped secondary winding of transformer T1 is applied across a grounded full wave bridge rectifier FWB to whose output is connected the lead 24V (whose dc voltage is nominally 24 volts), with a voltage transient protection diode D2 being connected acrodd bridge FWB to prevent noise transients from appearing on lead 24V. The ac voltage on the center tap of the secondary winding of transformer T1 (e.g., 12 vac) is connected by a resistor R1, a diode D3, and a resistor R2 to the positive terminal of a battery B1, whose negative terminal is connected to ground. The common junction of diode D3 and resistor R2 is coupled through a filter circuit 150 to a lead 5VB, upon which appears a dc supply voltage (nominally at 5 volts) for the components of the hardware clock (clock 132, counters 124, 128 and 134, and gates 126, 130) and for RAM 104. A diode D4 is connected from the common junction of resistor R1 and diode D3 to a lead 5V, upon which appears a dc supply voltage (nominally at 5 volts) for the remaining components of the controller illustrated in FIG. 2. The dc supply voltage on lead 5V is regulated by a grounded voltage regulator 152 connected in shunt with resistor R1 and diode D4. Resistors R1 and R2 and diode D3 also function as a trickle charger for the battery B1, so that battery B1 is maintained in a state of full charge during the times that power is being supplied from the source of alternating current.

If a power outage should be experienced, it is desirable to terminate the operation of the microprocessor in effecting load control, but to maintain the hardware clock in an operating condition and to maintain the contents of the scratch pad memory and event memory within RAM 104 so that the microprocessor may resume load control upon power restoration. Accordingly, capacitor C1 is connected from lead 24V to ground, and series-connected resistor R3 and zener diode ZD1 are connected from lead 24V to ground.

The common junction of resistor R3 and zener diode ZD1 is connected to the negative input of a fast acting comparator 154 whose output is connected by a lead LV to a RES IN terminal of CPU 100 (FIG. 2). Resistors R4 and R5 are connected from the center tap of the secondary winding of transformer T1 to ground, and the common junction of resistors R4 and R5 is connected to the positive input of comparator 154. The values of resistors R3, R4 and R5, and the reference voltage of zener diode ZD1, are chosen so that the signal applied to the positive input of comparator 154 is greater than the signal applied to the negative input of comparator 154 when the ac voltage from the source of alternating current is at its nominal thereof (110 vac). If the ac voltage from the source of alternating current should suddenly drop, as in the case of a power outage, the signal at the negative input of comparator 154 will decrease at a slower rate (due to the action of capacitor C1) than the signal at the positive input thereof. As the ac voltage from the source of alternating current continues to drop, a point will be reached, e.g., at 95 vac, at which the signal at the negative input of comparator 154 becomes greater than the signal at the positive input thereof. As a result, comparator 154 provides a low logic level signal on line LV which places CPU 100 in a reset condition, whereby ports 106, 108, 110A, 110B are reset to thereby effect blanking of all displays and de-energization of the load relays 148 within load control circuits 145. As the ac voltage from the source of alternating current continues to drop, the supply voltages present on leads 5V, 24V will not be sufficient to maintain the components connected thereto in operation, and the microprocessor will cease to function. However, the supply voltage on lead 5VB will now be supplied from the battery B1, and will continue to maintain the hardware clock in operation and to maintain the contents of the scratch pad memory and the event memory within RAM 104. By appropriate choice of the battery B1, the hardware clock may be maintained in operation and the contents of the scratch pad memory and event memory in RAM 104 may be maintained for a considerable period of time in the case of power outage, e.g., fourteen days.

Figure 5:
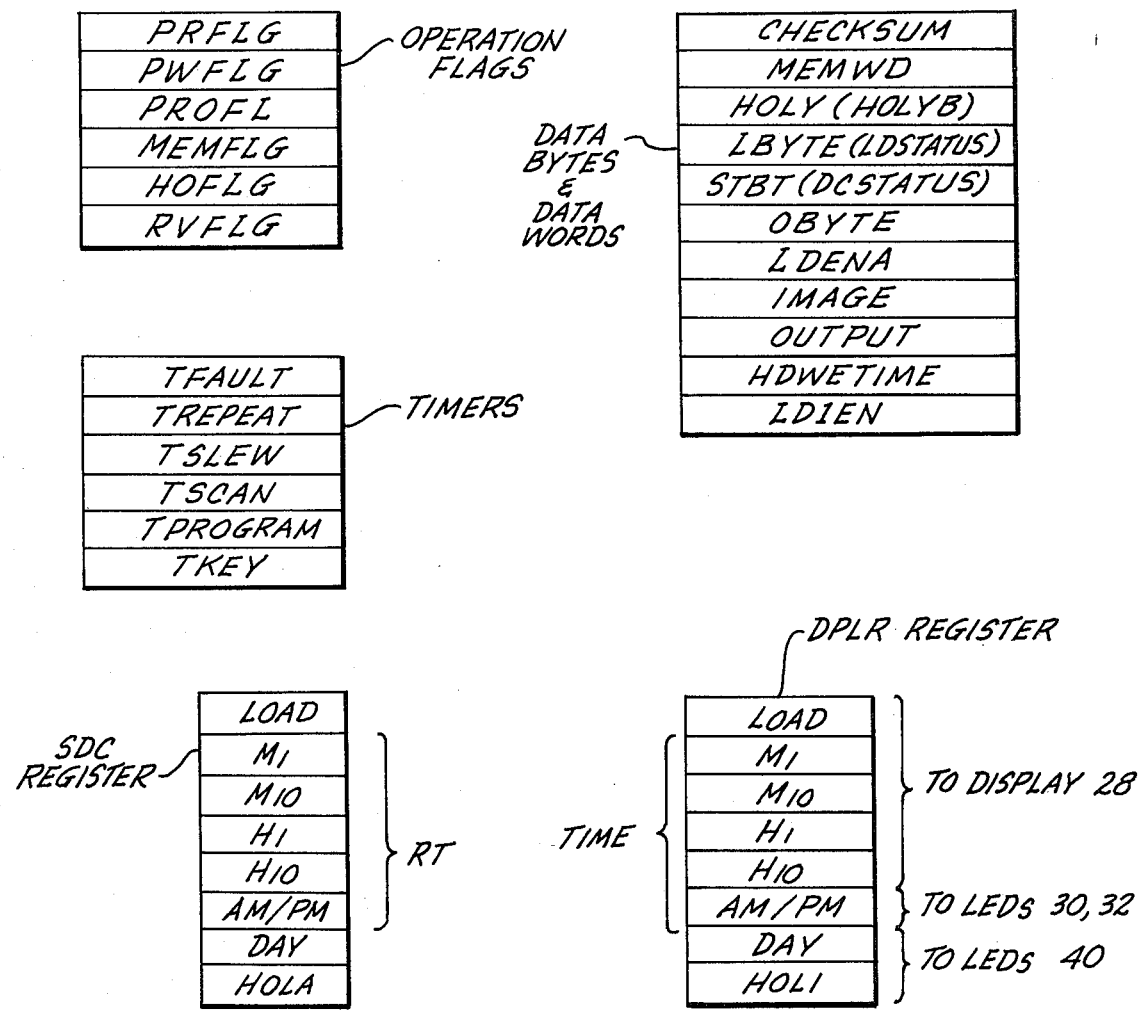
FIG. 5 is a schematic representation of various operation flags, timers, data bytes and registers contained within a scratch-pad memory within the microprocessor.

With reference now to FIG. 5, the scratch pad memory within RAM 104 is organized into a plurality of operation flags, a plurality of timers, a plurality of data bytes, an SDC (seven-day clock) register and a DPLR (display register, with each operation flag, timer, data byte and each field within the SDC and DPLR registers having a unique memory location within RAM 104. Each of the operation flags comprises a single data bit which is set or cleared by CPU 100 upon execution of certain program instructions in the routines and subroutines to be described hereinafter. Each of the timers comprises a data byte which is set to a predetermined count, and decremented in response to signals from the hardware clock during an INTERRUPT subroutine described hereinafter, in order to provide timing for various operations utilized in the routines and subroutines. The data bytes and data words comprise 8-bit data bytes and 16-bit data words (excepting the LD1EN byte) whose format and use will be described hereinafter. The SDC register includes a plurality of fields, collectively referred to as RT, and a DAY field which contain the real time within any week corresponding to real-time information obtained from the hardware clock. Specifically, the RT fields within the SDC register consist of: $M_1$ and $M_{10}$ fields, representing real-time minutes in units and tens; $H_1$ and $H_{10}$ fields, representing real-time hours in units and tens; and, an AM/PM field, representing whether real-time minutes and real-time hours are am or pm. The SDC register also has a LOAD field which always contains invalid data, and a single-bit HOLA field which is set when the real-time day is a holiday.

The DPLR register has a plurality of fields, including TIME and DAY fields whose organization corresponds to the RT and DAY fields within the SDC register. The DPLR register also has a LOAD field whose contents represent a load number, and a single-bit HOLI field which is set in certain circumstances to correspond to the HOLA field in the SDC register. Program instructions (not illustrated) are provided which cause CPU 100 to transfer the contents of the DPLR register to the display 28, to LEDs 30, 32 and to LEDs 40 (FIGS. 1 and 2) with such transfer occurring during the INTERRUPT subroutine described hereinafter.

Figure 6:
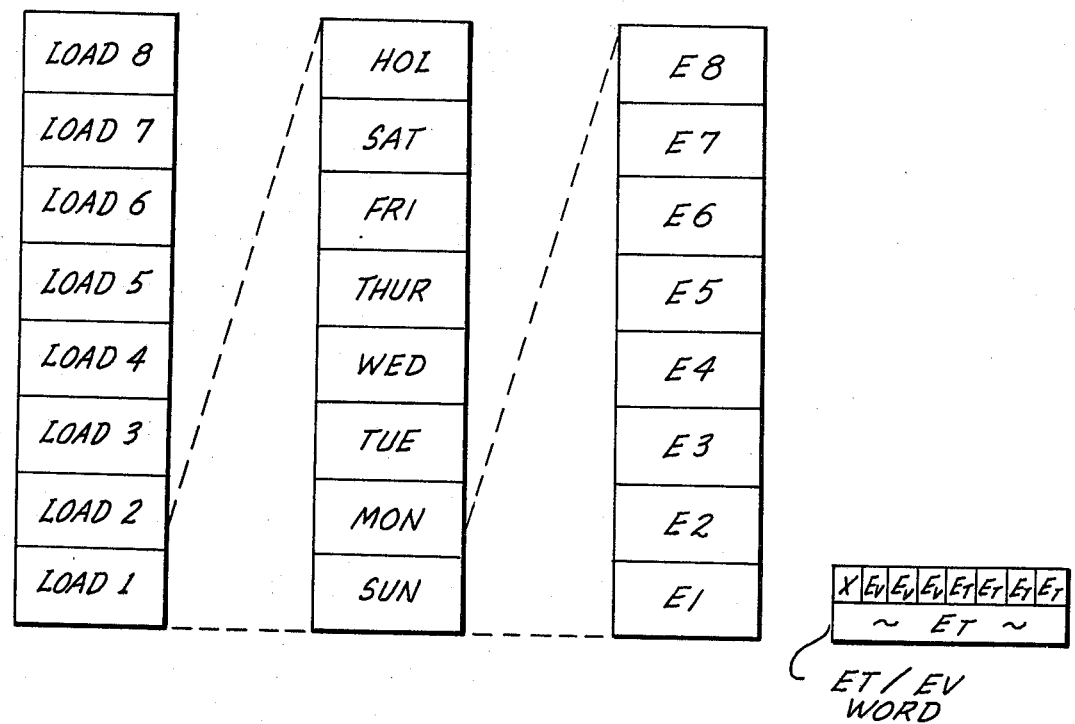
FIG. 6 is a schematic representation of the organization of an event memory within the microprocessor.

The event memory within RAM 104 is organized as illustrated in FIG. 6. Specifically, information relating to the schedule utilized by the microprocessor is stored in the form of ET/EV data words, with each such ET/EV data word including three bits representing a predetermined code for a control event (EV), and twelve bits representing the event time (ET) of that control event. The event memory locations for the ET/EV words are grouped first by loads (e.g., LOAD 1, LOAD 2, etc.). Within each such load grouping, the ET/EV words are grouped by days within a week (e.g., SUN, MON, etc). In addition, event memory locations are provided within each load grouping for the ET/EV data words relating to a holiday schedule (e.g., HOL), Within each day grouping, and within the holiday grouping, event memory locations are provided for eight ET/EV data words (e.g., E1, E2, etc.). As illustrated, the event memory therefore provides storage for eight control events for each day of the week, plus a holiday, for each one of eight loads, for a total of 512 control events.

Figure 7A:
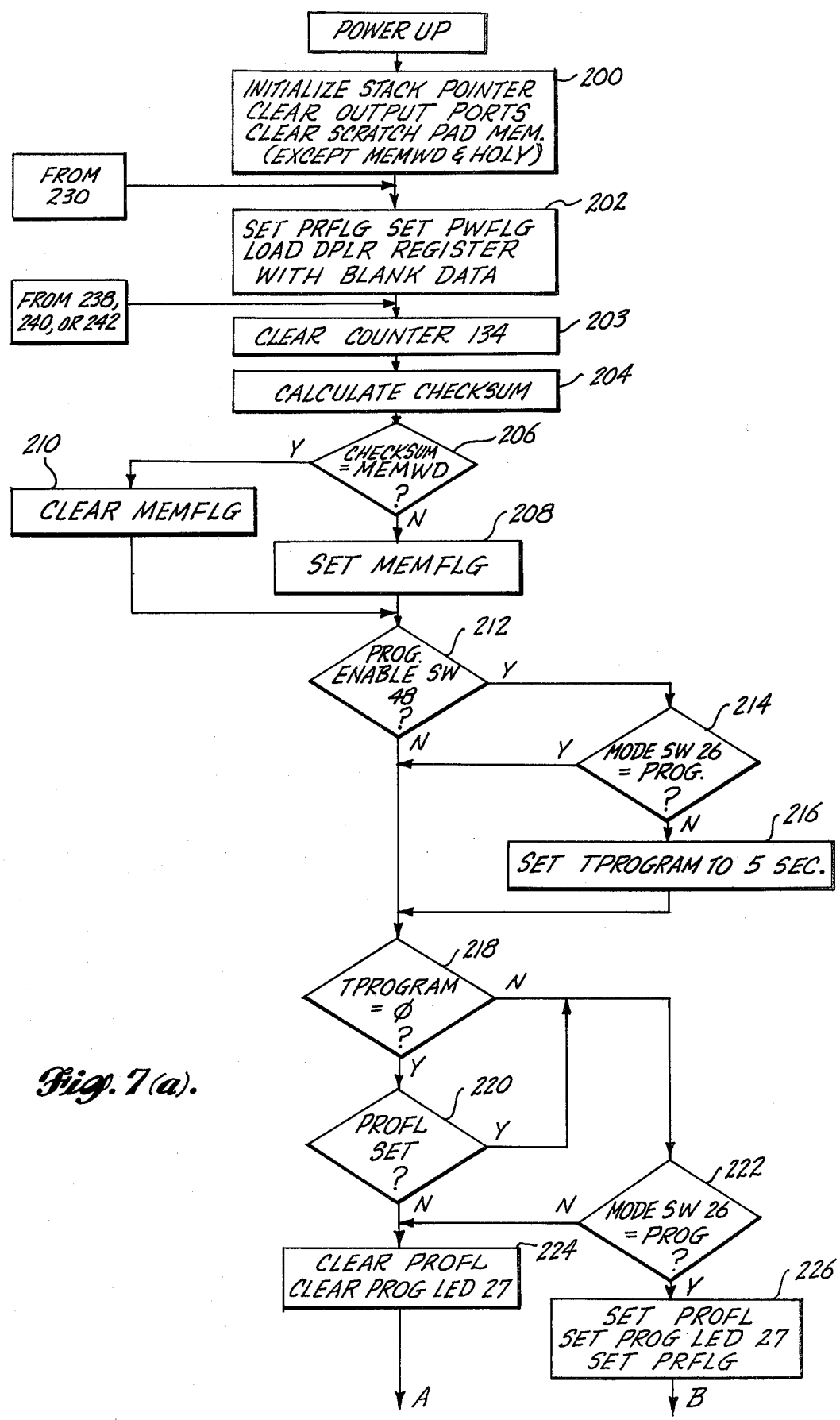
FIGS. 7(a) and 7(b) are a flow chart illustrating the program steps undertaken by the microprocessor in a main program loop.
Figure 7C:
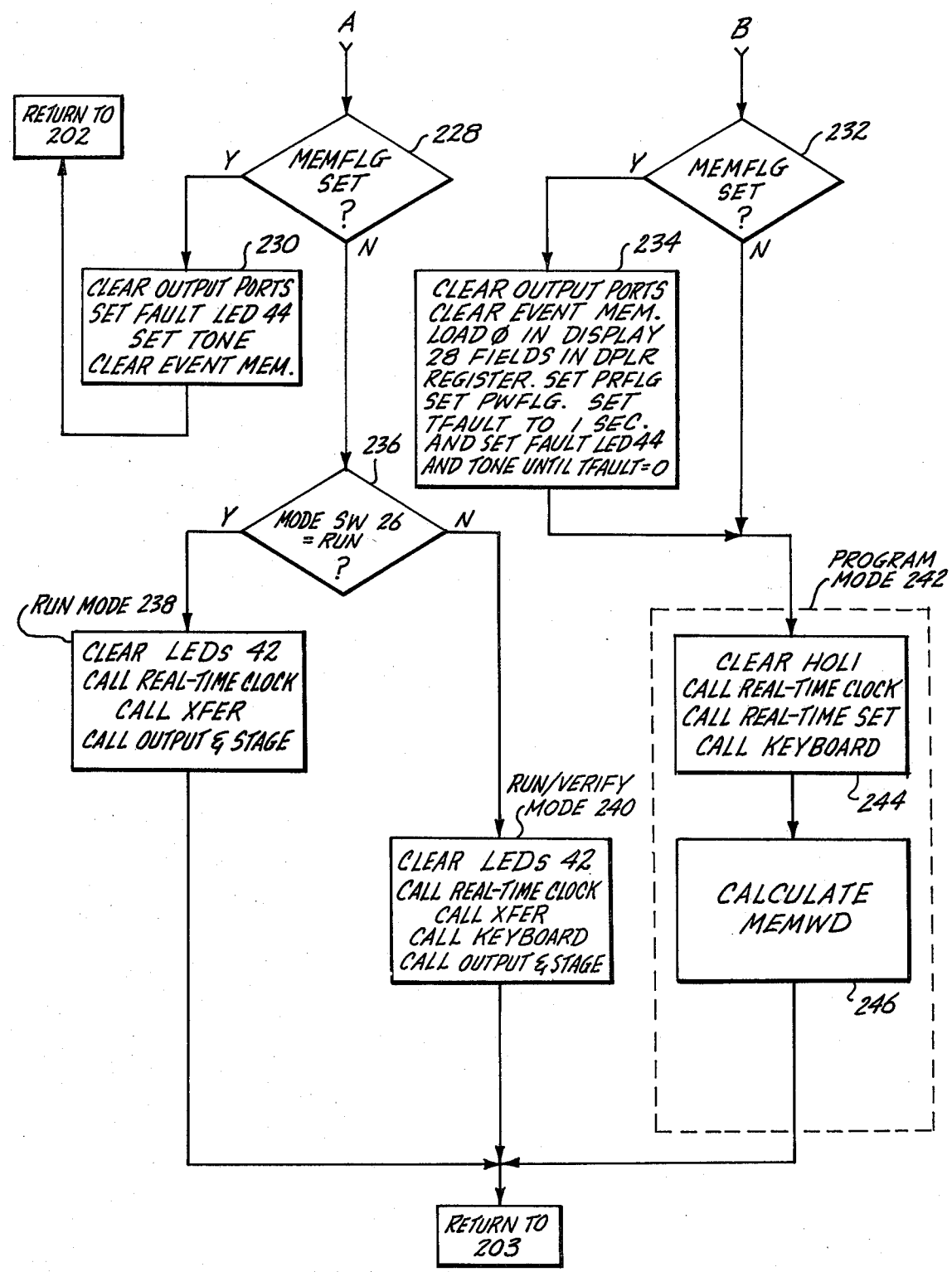

FIGS. 7(a) and 7(b) illustrate the main program loop of program instructions stored within PROM 102.

Upon application of power to the microprocessor, a POWER UP condition is detected by CPU 100 which enables CPU 100 to enter step 200, in which a stack pointer in RAM 104 is initialized. RAM 104, in addition to the scratch pad memory previously described, includes a stack, or holding, register which is used by CPU 100 to temporarily store certain information relating to the program step being executed by CPU 100 when a control signal from the hardware clock (e.g., the third clock signal at 256 Hz) appears on input terminal RST 7.5 thereof. Upon the production of each such control signal, CPU 100 is programmed to immediately enter into the INTERRUPT subroutine.

Accordingly, the stack register is provided to provide temporary storage of program information so that CPU 100 can return to a specific program step after completion of the INTERRUPT subroutine. The stack register is configured as a circulating register, with the address of the first byte in the program step then being executed being located in the stack pointer. Also in step 200, all output terminals in ports 106, 108 and 110A, 110B are cleared, and all contents of the scratch pad memory (FIG. 5), excepting the MEMWD and HOLY data bytes, are cleared.

CPU 100 then proceeds, in step 202, to set the PRFLG and PWFLG operation flags (FIG. 5) and to load all the fields in the DPLR register with blank data, whereupon the display 28 is blanked and the LEDs 30, 32 and all LEDs 40 are extinguished. In step 203, CPU 100 enters its main program loop and clears (i.e., resets) counter 134. Normally, CPU 100 will pass through the main program loop and return to step 203 in less time than is required for counter 134 to overflow. However, if CPU 100 should in some manner be inhibited from timely completing a pass through the main program loop, counter 134 will overflow as previously described, whereby CPU 100 is programmed (not illustrated) to return to step 200 and to reinitialize its operations. CPU 100 then proceeds, in step 204, to calculate and store the CHECKSUM data word, with CHECKSUM comprising the numerical sum of all data bits within the event memory (FIG. 6). CPU 100 then makes a test, in step 206, to determine if the CHECKSUM data work equals the MEMWD data word. As described hereinafter, MEMWD is calculated when the microprocessor is in the program mode and also equals the numerical sum of all data bits within the event memory. If power has been applied to the microprocessor for the first time, MEMWD will have not been previously calculated and accordingly the determination in step 206 will be negative. If power has been restored to the microprocessor after a power outage, MEMWD should equal CHECKSUM, provided that power has been restored within the hold-up period established by battery B1 (e.g., fourteen days), and the determination in step 206 will be affirmative. In any case, if the event memory malfunctions, the determination in step 206 will be negative. If the determination in step 206 is negative, CPU 100 proceeds, in step 208, to set the MEMFLG operation flag. If the determination in step 206 is affirmative, CPU 100 proceeds, in step 210, to clear MEMFLG. When MEMFLG is set, the microprocessor forces the user to select the program mode, as described hereinafter.

From either step 208 or step 210, CPU 100 proceeds, in step 212, to determine if the program enable switch 48 is being actuated. Let it be assumed that the user has not so actuated the program enable switch 48, whereupon the determination in step 212 is negative. As a result, CPU 100 proceeds, in step 218, to determine if the TPROGRAM timer is at zero. Since TPROGRAM has been cleared in step 200, the determination in step 218 is affirmative, whereupon CPU 100, in step 220, determines if the PROFL operation flag has been set. Since PROFL has been cleared in step 200, the determination in step 220 is negative, whereupon CPU 100, in step 224, clears PROFL and the PROGRAM LED 27.

Thereafter, in step 228, CPU 100 determines if MEMFLG has been set. Let it be assumed that power has been initially applied to the microprocessor, or that an event memory malfunction has occurred, and that MEMFLG has been set in step 208. The determination in step 228 is therefore affirmative, whereupon CPU 100, in step 230, clears the output terminals in ports 106, 108 and 110A, 110B, and clears all memory locations within the event memory. CPU 100 also sets (i.e., lights) the FAULT LED 44, and causes the production of a tone by audible alarm 54, to accordingly signify to the user that the microprocessor must be placed in its program mode. CPU 100 then returns to step 202, and continues to circulate in the loop described until the user has actuated the program enable switch 348.

Upon actuation of the program enable switch 48, the determination in step 212 is affirmative, whereupon CPU 100, in step 214, determines if the mode switch 26 has been set to its PROGRAM position. If the user has set the mode switch 26 to its PROGRAM position before actuating the program enable switch 48, the determination in step 214 is affirmative, whereby CPU 100 proceeds through steps 218 et seq. as previously described, whereupon the FAULT LED 44 and the tone from audible alarm 54 are maintained on to signify to the user that the program mode must be entered in a proper manner.

If the user has not set the mode switch 26 to its PROGRAM position before actuating the program enable switch 48, however, the determination in step 214 is negative, whereupon CPU 100, in step 216, sets the TPROGRAM timer to a count representing five seconds.

Upon setting of TPROGRAM, the determination in step 218 is negative, whereupon CPU 100, in step 222, again determines if the mode switch 26 has been set to the PROGRAM position. If the determination in step 222 is negative, CPU 100 continues to loop through steps 224, 228, 230, 202, 203, 204, 206, 208, 212, 218, 220 and 222 for a period of five seconds (i.e., until TPROGRAM has decremented to zero), accordingly giving the user that period of time in which to set the mode switch 26 to the PROGRAM position.

Assuming that the user has set the mode switch 26 to the PROGRAM position within the five-second period, the determination in step 222 is affirmative, whereupon CPU 100, in step 226, sets the PROFL operation flag, sets the PROGRAM LED 27, and sets the PRFLG operation flag. CPU 100 then proceeds, in step 232, to determine if MEMFLG has been set. If the determination in step 232 is affirmative, CPU 100, in step 234, proceeds to clear the output terminals in ports 106, 108 and 110A and 110B, to clear the event memory locations in the event memory, to load the fields within the DPLR register which are coupled to the display 28 with zeros (excepting the LOAD field in the DPLR register which is loaded with blank data), whereupon the LOAD character display in display 28 is blanked and the remaining character displays in display 28 each display "0", and to set the PRFLG and PWFLG operation flags. CPU 100 also sets TFAULT to one second, and sets the FAULT LED 44 and the tone from audible alarm 54 until the count within TFAULT is decremented to zero. The indication provided by the momentary lighting of the FAULT LED 44, and the concurrent production of a tone from audible alarm 54, signifies to the user that the event memory has been cleared and that a new schedule must be entered therein. From step 234, CPU 100 proceeds to its PROGRAM mode 242.

If the determination in step 232 is negative (e.g., there is no event memory malfunction and the user wishes to alter a previously-entered schedule), CPU 100 does not undertake the actions in step 234, but rather proceeds directly to its PROGRAM mode 242.

Within step 244 in the PROGRAM 242, the HOLI field in the DPLR register is cleared. As explained hereinafter, the HOLI field is set when the day in real-time corresponds to a day selected as a holiday. Also, the HOLY data byte in the scratch pad memory (FIG. 5) within RAM 104 includes seven HOLYB bits, one for each day of the week, with each HOLYB bit being set, during the time that the microprocessor is in its run/verify mode of operation, when the user selects the corresponding day as a holiday upon actuation of the HOLIDAY key in keyboard 38.

After clearing HOLI, CPU 100 calls a REAL-TIME CLOCK routine, a REAL-TIME SET routine, and a KEYBOARD routine in sequence, along with their associated routines and subroutines, as described in detail hereinafter. In summary, the actions undertaken by CPU 100 in step 244 allow: for the updating of the fields within the SDC register in accordance with real-time information obtained from the hardware clock; for setting of the time within the hardware clock to any desired time; and, for the servicing of a keyboard entry by the user through use of the keyboard 38. From step 244, CPU 100 proceeds, in step 246, to calculate the store MEMWD. From step 246, CPU 100 then exits from the PROGRAM mode 242 and returns to step 203. The determination in step 206 is now affirmative, as a result of which CPU 100 proceeds in step 210, to clear MEMFLG. Assuming that the mode switch 26 remains at the PROGRAM position, CPU 100 will again return to its PROGRAM mode 242. As an example, let it be assumed that TPROGRAM has decremented to zero. Accordingly, the determination in step 218 is affirmative. However, since PROFL has been set, the determination in step 220 is affirmative, whereupon CPU 100 proceeds through steps 222 and 226 to step 232. Since MEMFLG has been cleared, the determination in step 232 is negative, whereupon CPU 100 returns to the PROGRAM mode 242.

As can be appreciated, CPU 100 will continue to pass through the portion of the main program loop including the PROGRAM mode 242 for as long as the mode switch 26 is set to the PROGRAM position. Therefore, the user is permitted whatever time is required to enter a schedule into the microprocessor.

Figure 12:
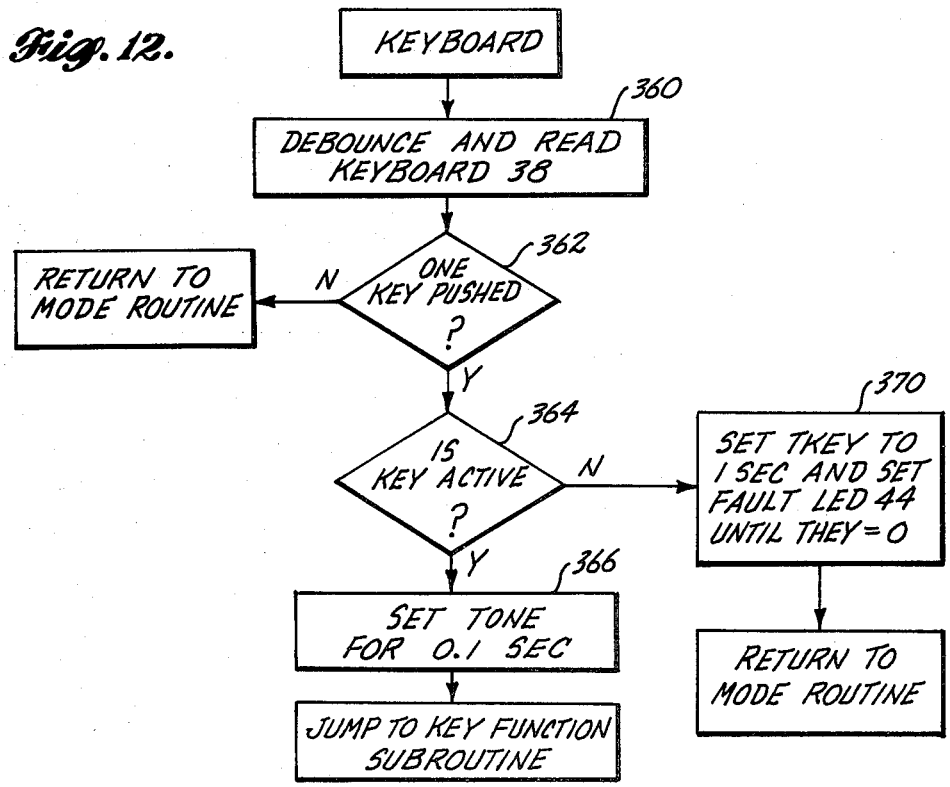
FIG. 12 is a flow chart of the program steps undertaken by the microprocessor in a KEYBOARD routine.
Figure 13:
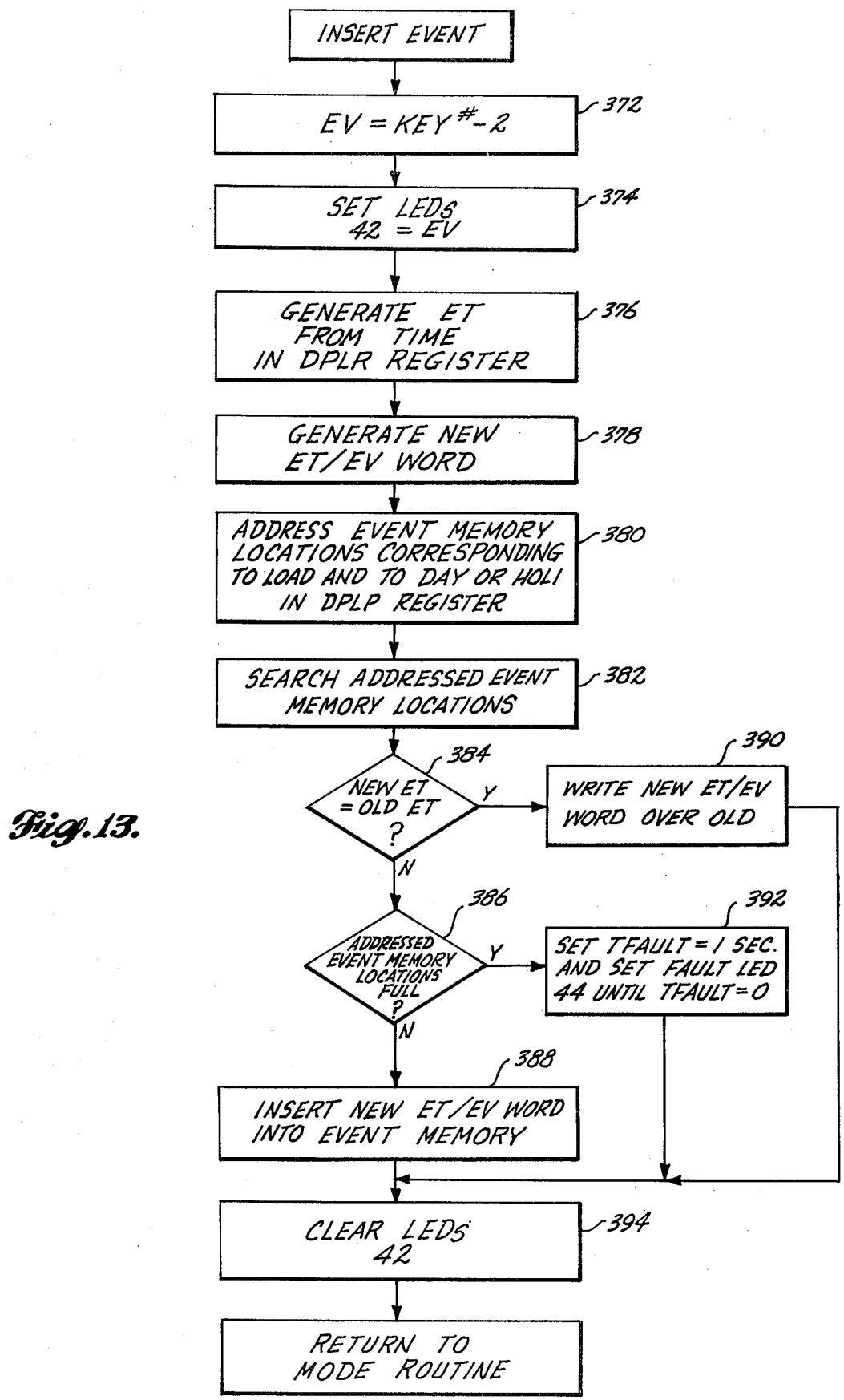
FIG. 13 is a flow chart of the program steps undertaken by the microprocessor in an INSERT EVENT subroutine.
Figure 14:
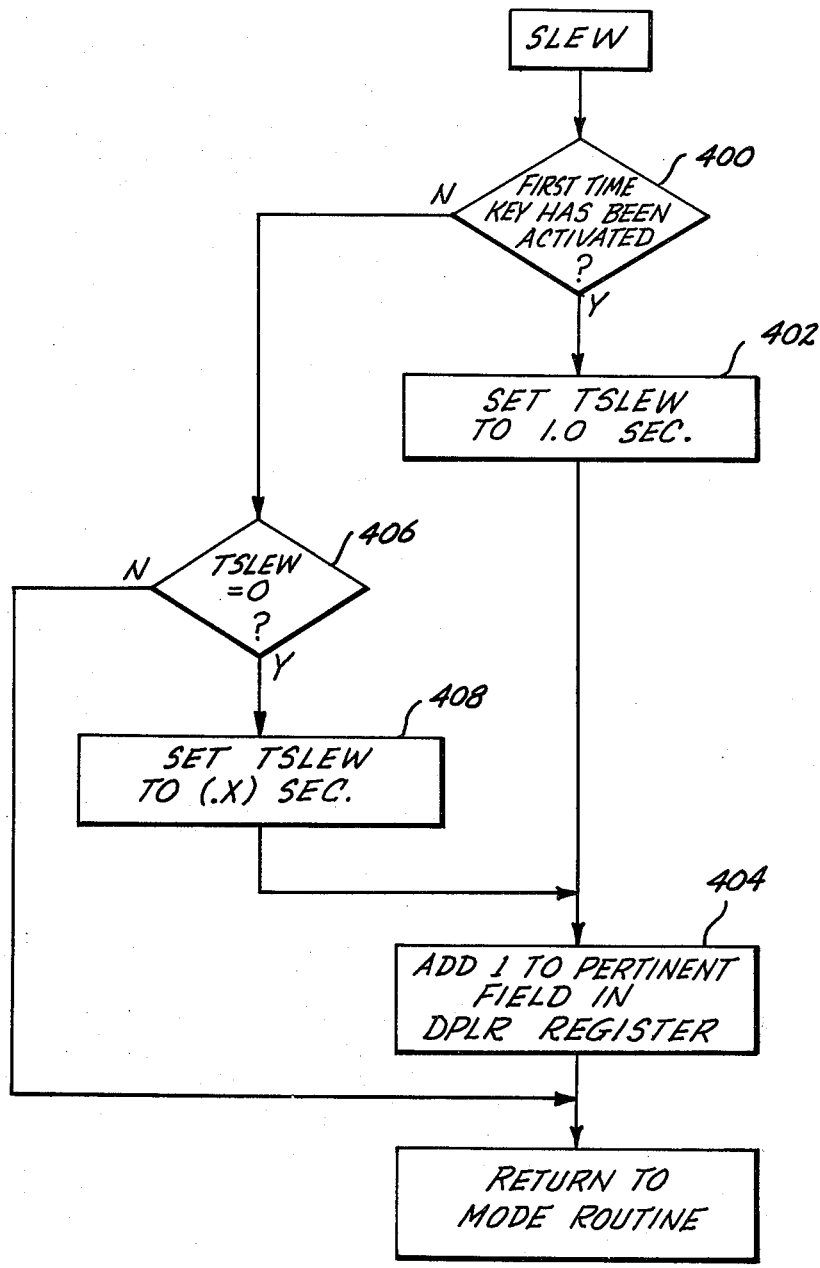
FIG. 14 is a flow chart of the program steps undertaken by the microprocessor in a SLEW subroutine.
Figure 15:
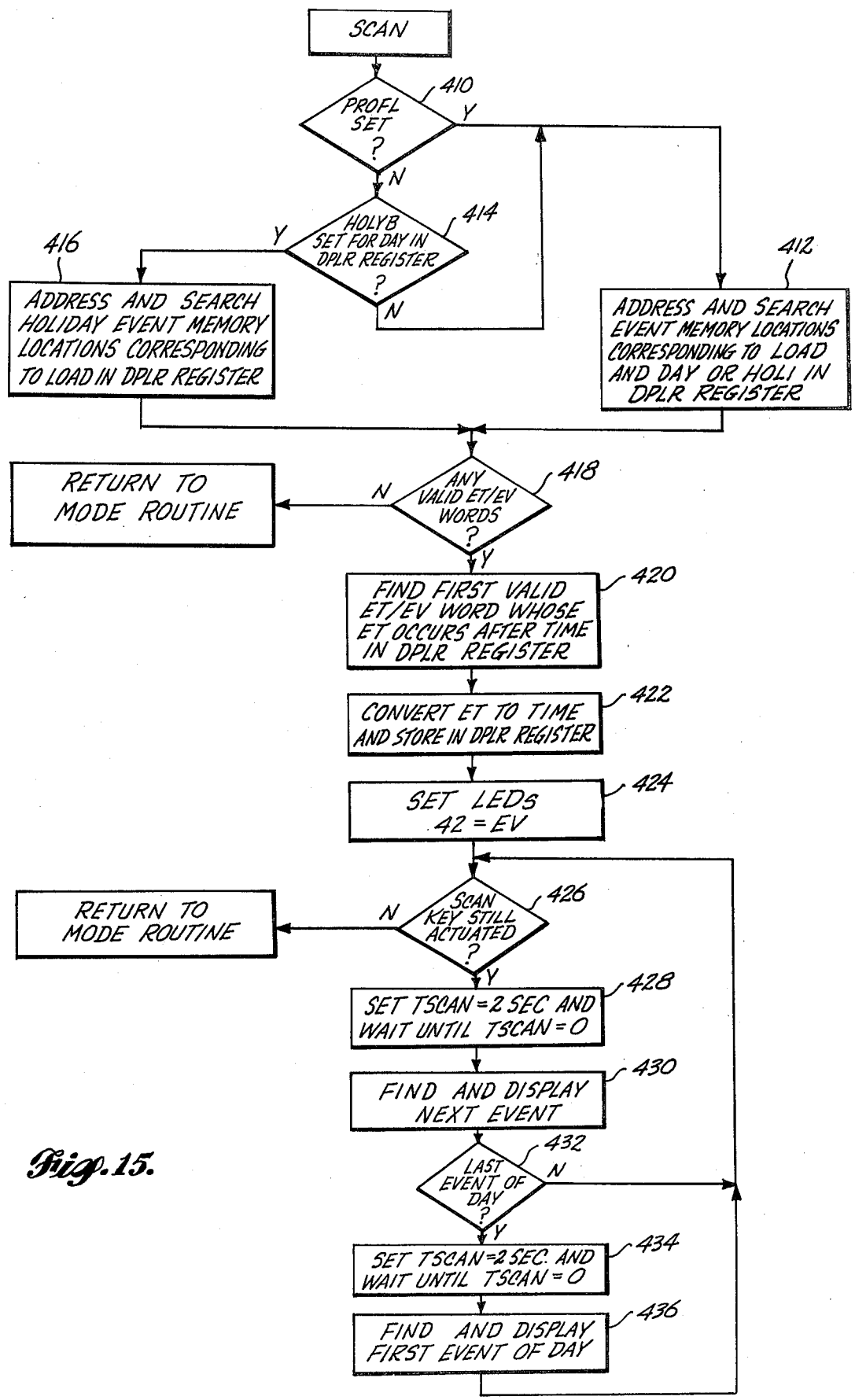
FIG. 15 is a flow chart of the program steps undertaken by the microprocessor in a SCAN subroutine.

Let it be assumed that CPU 100 has processed the REAL-TIME CLOCK and REAL-TIME SET routines within step 244 in the PROGRAM mode 242, and has proceeded to the KEYBOARD routine illustrated in FIG. 12. Initially, CPU 100, in step 360, debounces and reads the keyboard 38, and effects transfer of data from the input terminals of port 108 to internal registers within CPU 100. In step 362, CPU 100 then determines if one, and only one, key has been actuated. If the determination is step 362 is negative, i.e., the user has made an error in data entry by actuating more than one key, CPU 100 returns to the mode routine currently being processed (in the case being discussed, the PROGRAM mode 242). Whenever CPU 100 is stated, in the ensuing discussion, as "returning to the mode routine," it should be understood that CPU 100 jumps to the next routine, or branch routine, in the step then being executed, or to the next step in the mode routine then being executed. For example, if CPU 100 is in the PROGRAM mode 242, and if the determination in step 362 is negative, CPU 100 jumps to step 246.

If the determination in step 362 is affirmative, however, CPU 100 proceeds, in step 364, to determine if the key that has been actuated is an "active" key. In this regard, only certain of the keys in the keyboard 38 are active when the microprocessor is in its program mode of operation, and only certain of the keys in keyboard 38 are active when the microprocessor is in its run/verify mode of operation. CPU 100 makes the determination in step 364 by referring to a look-up table in PROM 102 which contains a listing of pertinent information relating to the keys in keyboard 38. Table II sets forth an example of such a listing.

TABLE II

| Key # | Key Label | Mode Run/Verify | Mode Program | Key Function Subroutine |
|---|---|---|---|---|
| 1 | REPEAT | E | A | REPEAT |
| 2 | (OFF) 0 | E | A | INSERT EVENT |
| 3 | 5 | E | A | INSERT EVENT |
| 4 | 10 | E | A | INSERT EVENT |
| 5 | 15 | E | A | INSERT EVENT |
| 6 | 20 | E | A | INSERT EVENT |
| 7 | 25 | E | A | INSERT EVENT |
| 8 | (ON) 30 | E | A | INSERT EVENT |
| 9 | CLEAR | E | A | CLEAR |
| 10 | HOLIDAY | A | E | HOLIDAY |
| 11 | TIME | A | A | TIME |
| 12 | SCAN | A | A | SCAN |
| 13 | MINUTE | A | A | SLEW |
| 14 | HOUR | A | A | SLEW |
| 15 | DAY | A | A | SLEW |
| 16 | LOAD | A | A | SLEW |

E - ERROR
A - ACTIVE

If the determination in step 364 is affirmative, CPU 100, in step 366, sets the audible alarm 54 for a period of 0.1 seconds, whereupon a momentary tone is sounded thereby to signify to the user that a proper data entry has been made, and then jumps to a key function subroutine for the particular key that has been pressed. Table II also contains a listing of the key function subroutines for each of the keys within keyboard 38.

If the determination in step 364 is negative, i.e., the actuated key is not active (reference again Table II), CPU 100 proceeds, in step 370, to set the TKEY timer to a count representing one second, and sets the FAULT LED 44 until the count within TKEY equals zero, thereby signifying to the user that an improper data entry has been attempted. From step 370, CPU 100 returns to the mode routine then being executed.

The user will have been instructed to enter the schedule for load control into the microprocessor by selecting each load and each day and by selecting each event time and corresponding control event for the thus-selected load and day. In order to select a load, the user actuates the LOAD key in keyboard 38, and in order to select the event time and day, the user actuates the MINUTE, HOUR and DAY keys in keyboard 38. The actuation of any of these keys causes CPU 100 to jump to the SLEW key function subroutine illustrated in FIG. 14. Initially, CPU 100, in step 400, determines if the key actuation is the first such actuation for the key in the processing of the mode routine then being executed. If the determination in step 400 is affirmative, CPU 100, in step 402, sets the TSLEW timer to a count representing one second, and then proceeds, in step 404, to add a decimal "1" to the pertinent field in the DPLR register. Let it be assumed that the LOAD key has been actuated and that the LOAD field in the DPLR register contains blank data (e.g., step 234, FIG. 7(b)). The LOAD field in the DPLR register will contain data, after step 404, representing "1" which will result in the numeral "1" being displayed by the LOAD character display in display 28. From step 404, CPU 100 returns to the mode routine.

If the key remains actuated, CPU 100 returns to the SLEW key function subroutine upon its next pass through the main program loop. At this time, the determination in step 400 is negative, whereupon CPU 100 proceeds, in step 406, to determine if the count in TSLEW is equal to zero. The initial determination in step 406 will be negative (since TSLEW has been set to a count representing one second), whereupon CPU 100 returns to the mode routine. CPU 100 continues to pass through the main program loop in this manner until TSLEW has been decremented to zero, whereupon the determination in step 406 is affirmative. Thereafter, CPU 100, in step 408, sets TSLEW to a count representing .x second (with x being dependent on the key that has been actuated), and then returns to step 404, wherein the pertinent field in the DPLR register is incremented so that the display afforded by the corresponding character display in display 28 is incremented by decimal "1". Accordingly, the user may select a desired load by actuating and holding the LOAD key until the desired load number appears in the display 28. Likewise, the user may select a desired event time and day by actuating and holding the MINUTE, HOUR, and DAY keys until the desired event time is displayed by display 28, LEDs 30, 32 and LEDs 40. Since it is desired to increment the display of minutes at a faster rate than the load number, hour and day displays, the factor x utilized in step 408 for the MINUTE key is preferably much less than that utilized for the LOAD, HOUR and DAY keys. At this point, it should be noted that when the DAY field in the DPLR register has been incremented to its full count (i.e., seven days), continued actuation of the DAY key will cause the DAY field to overflow and the HOLI field to be set. Upon overflow of any field in the DPLR register, that field will be cleared so that the corresponding display can be continuously advanced for as long as the corresponding key is actuated.

With the load, day, and event time thus selected, the operator will have been instructed to select a control event by actuation of one of the event keys in the keyboard 38. Upon actuation of an event key, CPU 100 jumps to the INSERT EVENT key function subroutine illustrated in FIG. 13. Initially, CPU 100, in step 372, generates an EV number, representing the desired control function, as equal to the key number (reference Table II) minus 2. For convenience, the EV numbers are listed in Table III.

TABLE III

| EV | KEY | |
|---|---|---|
| 6 | 30(ON) | |
| 5 | 25 | |
| 4 | 20 | |
| 3 | 15 | DUTY-CYCLE CONTROL FUNCTION |
| 2 | 10 | |
| 1 | 5 | |
| 0 | 0(OFF) | |

In step 374, CPU 100 lights the corresponding LED 42. In step 376, CPU 100 generates an event time ET from the TIME fields within the DPLR register (which represent the selected event time). In step 378, CPU 100 then generates a new ET/EV data word from the EV number and event time ET generated in steps 372 and 376, with the format of the ET/EV data word corresponding to that illustrated in FIG. 6.

CPU 100 then proceeds, in step 380, to address the event memory locations corresponding to the LOAD field and to the DAY or HOLI fields in the DPLR register. In step 382, CPU 100 searches the addressed event memory locations. CPU 100 then determines, in step 384, if the ET in the new ET/EV data word corresponds to an ET in the addressed event memory locations, i.e., the selected event time corresponds to an event time of a previously entered control event. If the determination in step 384 is negative (e.g., the event memory has been cleared), CPU 100, in step 386, determines if the addressed event memory locations are full. If the determination in step 386 is negative, CPU 100 proceeds, in step 388, to insert or store the new ET/EV data word into an appropriate location in the event memory. CPU 100 then proceeds, in step 394, to clear the LED 42 which was lit in step 374, and thereafter returns to the mode routine.

Let it be assumed that the event memory already contains one or more ET/EV data words in the event memory locations addressed in step 382. If the ET in the new ET/EV data word corresponds to any ET in the addressed event memory locations, the determination in step 384 is affirmative so that CPU 100 proceeds, in step 390, to write the new ET/EV data word over the old ET/EV data word having the same ET, and then returns to step 394. Likewise, if the addressed event memory locations are full, e.g., they contain eight ET/EV data words, the determination in step 386 is affirmative, whereupon CPU 100, in step 392, sets TFAULT to a count representing one second, and sets the FAULT LED 44 until the count within TFAULT goes to zero, to thereby signify to the user that an improper data entry has been attempted. From step 392, CPU 100 proceeds to step 394.

In this manner, the schedule for load control for an entire week can be entered into the event memory. If the user wishes to copy the schedule for a selected load and for a selected day into the event memory locations for that load and for one or more, succeeding days, the user will actuate the REPEAT key in keyboard 38. Actuation of the REPEAT key causes CPU 100 to jump to the REPEAT key function subroutine illustrated in FIG. 16. Initially, CPU 100, in step 440, copies the ET/EV data words in the event memory locations corresponding to the selected day and load (represented by the DAY and LOAD fields in the DPLR register) into the event memory locations corresponding to the succeeding day and to the selected load. In step 442, CPU 100 then proceeds to increment the DAY field in the DPLR register by one, whereupon the LED 40 for the succeeding day is lit to accordingly signify to the user that the schedule has been copied, and then returns to the mode routine. If desired, the user may copy the schedule for additional succeeding days by subsequent actuations of the REPEAT key.

Likewise, the user may wish to erase the schedule for a selected day and load. Accordingly, the user, after selecting the day and load by actuation of the DAY and LOAD keys in the manner previously described, actuates the CLEAR key in keyboard 38, whereupon CPU 100 jumps to the CLEAR subroutine illustrated in FIG. 17. In step 450, the event memory locations corresponding to the thus-selected day and load (represented by the DAY and LOAD fields in the DPLR register) and filled with invalid data words, e.g., zeros. Thereafter, CPU 100 returns to the mode routine.

Figure 10:
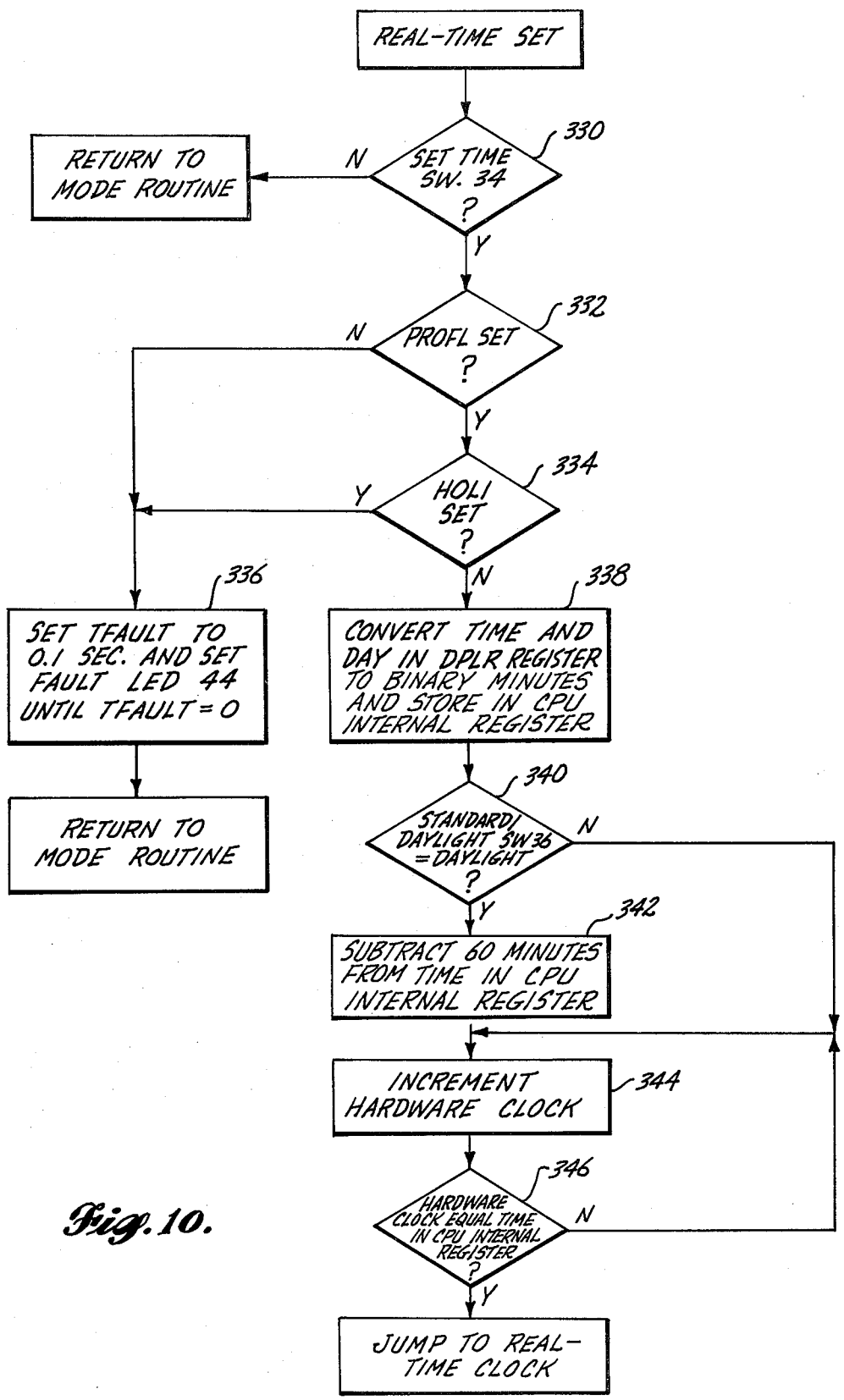
FIG. 10 is a flow chart of the program steps undertaken by the microprocessor in a REAL-TIME SET routine.

During each pass through step 244 in the PROGRAM mode 242, the CPU 100 calls the REAL-TIME CLOCK routine (FIG. 8) and the REAL-TIME SET routine (FIG. 10).

Figure 8:
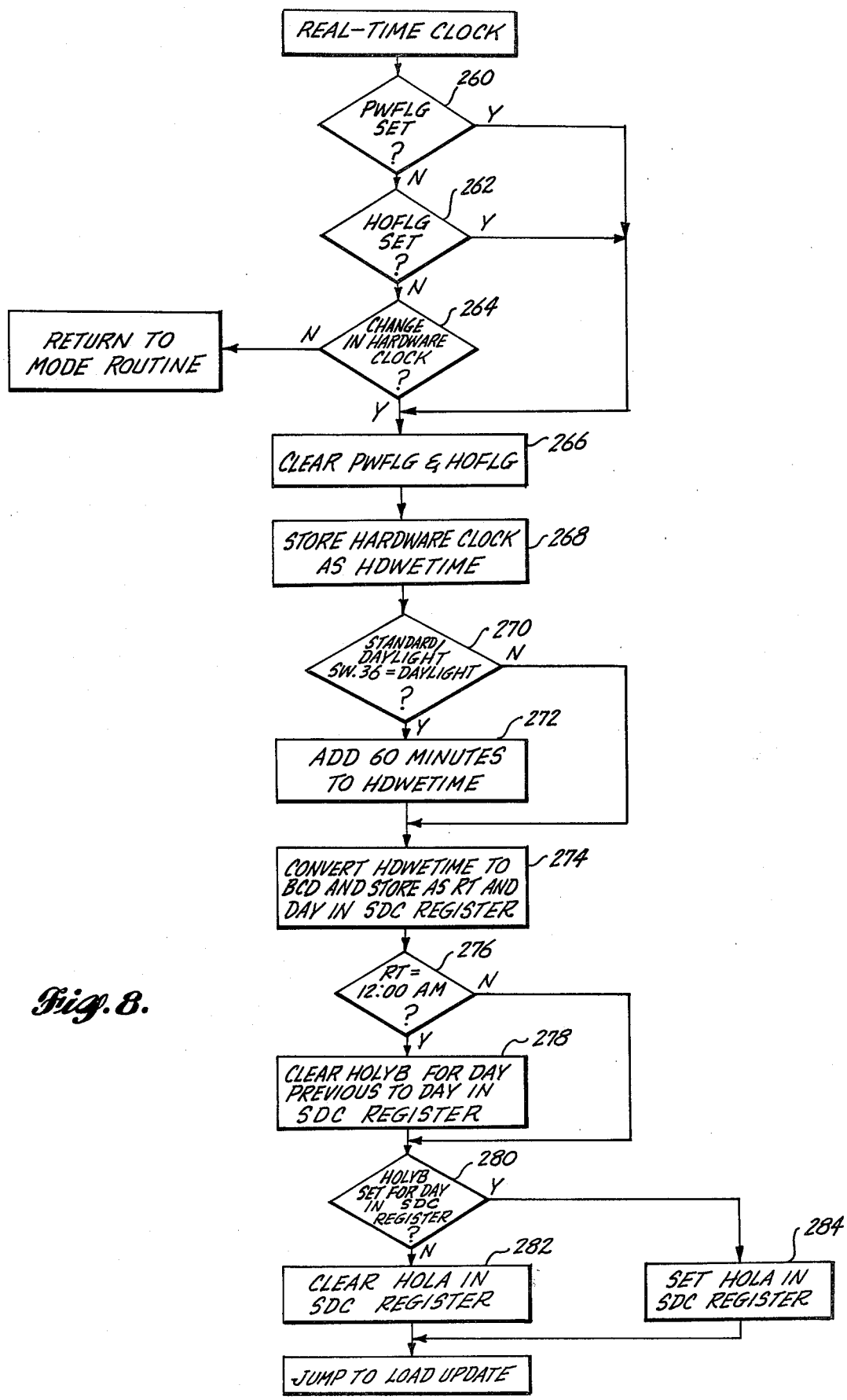
FIG. 8 is a flow chart of a program step undertaken by the microprocessor in a REAL-TIME CLOCK routine.
Figure 9:
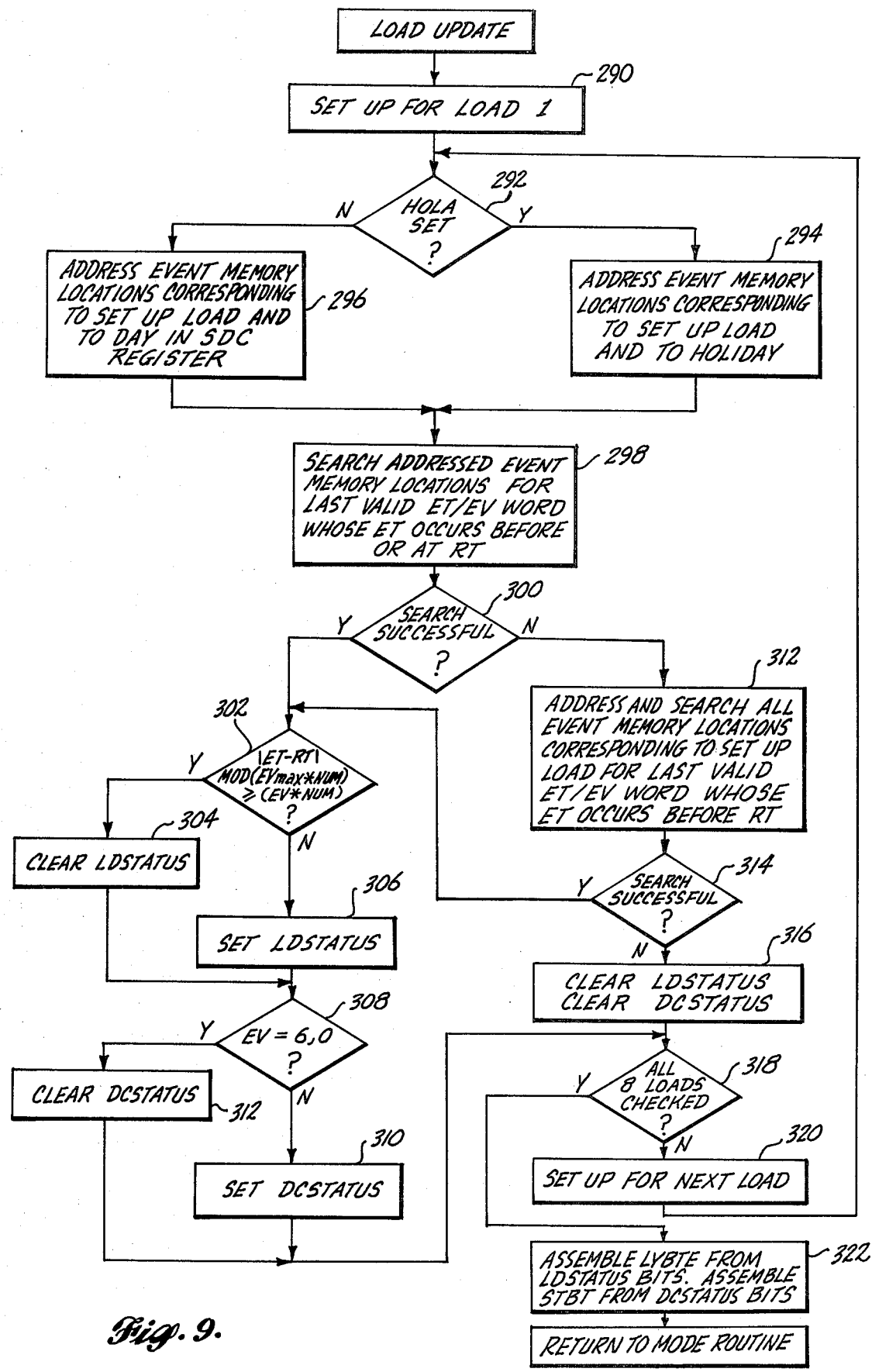
FIG. 9 is a flow chart of the program steps undertaken by the microprocessor in a LOAD UPDATE routine.

With reference now to FIG. 8, the REAL-TIME CLOCK routine permits the contents of the SDC register to be updated to correspond to the realtime information within the hardware clock. Also, the HOLA field within the SDC register is set, or cleared, depending upon whether the real-time day has been selected as a holiday. Further, by jumping to a LOAD UPDATE branch routine illustrated in FIG. 9, the desired status of each load is updated through comparison of the contents of the SDC register with the schedule contained in the event memory.

In the REAL-TIME CLOCK routine, CPU 100 proceeds to update the contents of the SDC register, but only upon the occurrence of any one of three conditions: a POWER UP condition or an event memory malfunction has occurred, e.g., PWFLG is set in step 202, see FIG. 7(a); the HOLIDAY key in keyboard 38 has been actuated when the microprocessor is in its run/verify mode of operation, e.g., the HOFLG operation flag has been set, as described hereinafter; or, the time within the hardware clock has changed since the previous pass of CPU 100 through the REAL-TIME CLOCK routine. CPU 100 accordingly determines if any of these conditions have been met in steps 260, 262 and 264. If none of the conditions have been met, CPU 100 returns to the mode routine. If any of the conditions have been met, CPU 100 proceeds, in step 266, to clear PWFLG and HOFLG. Thereafter, CPU 100, in step 286, stores the time within the hardware clock (which is a binary representation of the minutes that have transpired since the beginning of the week, as previously described) as the HDWETIME data byte in RAM 104. In step 270, CPU 100 determines if the STANDARD/DAYLIGHT switch 36 has been set to the DAYLIGHT position. If the determination in step 270 is affirmative, CPU 100 proceeds, in step 272, to add the binary representation of sixty minutes to HDWETIME, and then proceeds to step 274. If the determination in step 270 is negative, CPU 100 proceeds directly to step 274. At this point, it should be noted that the time within the hardware clock is always in standard time, and that the corresponding real-time information in the SDC register is advanced by sixty minutes from the time in the hardware clock only upon setting of the STANDARD/DAYLIGHT switch 36 to the DAYLIGHT position.

In step 274, HDWETIME (in binary minutes) is converted to corresponding day, am/pm, hour and minute information (in BCD form) and stored in the appropriate RT and DAY fields within the SDC register (FIG. 5).

In step 276, CPU 100 determines if the real-time information within the RT fields in the SDC register represents 12:00 am, i.e., a new day has begun. If the determination in step 276 is positive, CPU 100 proceeds, in step 278, to clear the HOLYB bit (in HOLY) for the day immediately previous to the day represented by the DAY field in the SDC register. HOLY includes a HOLYB bit for each day of the week, with the HOLYB bit being set as described hereinafter upon actuation of the HOLIDAY key in keyboard 38. By undertaking the actions in step 278, CPU 100 insures that the holiday schedule in the event memory will be followed only upon the first occurrence of the day selected as a holiday following actuation of the HOLIDAY key. From step 278, CPU 100 proceeds to step 280. Likewise, if the determination in step 276 is negative, CPU 100 proceeds directly to step 280.

In step 280, CPU 100 determines if the HOLYB bit (in HOLY) has been set for the day represented by the DAY field in the SDC register. If the determination in step 280 is affirmative, the HOLA field in the SDC register is set in step 284. If the determination in step 280 is negative, the HOLA field in the SDC register is cleared in step 282. From either step 282 or step 284, CPU 100 jumps to the LOAD UPDATE routine illustrated in FIG. 9.

Within the LOAD UPDATE routine, the status of each load is updated through a comparison of the real-time information within the SDC register with the schedule for that load contained in the event memory. Initially, CPU 100, in step 290, is conditioned or set-up for load 1, i.e., is enabled to address those event memory locations corresponding to load 1 (FIG. 6). In step 292, CPU 100 determines if the HOLA field within the SDC register has been set (reference steps 282, 284 in the REAL-TIME CLOCK routine in FIG. 8). If the determination in step 292 is affirmative, i.e., the real-time day has been selected as a holiday, CPU 100 proceeds, in step 294, to address the event memory locations corresponding to the set-up load and to the holiday schedule therefore. If the determination in step 292 is negative, i.e., the real-time day is not a holiday, CPU 100 proceeds, in step 296, to address the memory locations corresponding to the set-up load and to the day represented by the DAY field in the SDC register.

From either step 294 or step 296, CPU 100 proceeds, in step 298, to search the addressed event memory locations for the last valid ET/EV data word whose event time (ET) occurs before or at the real-time information in the RT fields within the SDC register. In step 300, CPU 100 determines if the search has been successful. If the determination in step 300 is affirmative, CPU 100, in step 302, proceeds to determine if a change in status of the set-up load is required. Specifically, CPU 100 applies the mathematical relationship:

$$|ET-RT|MOD(EV_{max}*NUM) \geq (EV*NUM)$$

where $|ET-RT|$ = the absolute difference, in minutes, between the event time and real-time;

NUM = the smallest number of minutes in any control interval for which a change in load status will be effected (in the embodiment being discussed, NUM=5);

$|ET-RT|MOD(EV_{max}*NUM)$ = the remainder after dividing $|ET-RT|$ by $(EV_{max}*NUM)$;

EV is an integer representing the control event (see Table III), ranging from $EV_{min}=0$ for an off control function to $EV_{max}$ for an on control function; and $(EV_{max}*NUM)$ is the number of minutes in a control interval.

If the determination in step 302 is affirmative, the set-up load is to be off. If the determination in step 302 is negative, the set-up load is to be on.

To give an example, let it be assumed that real time is 1:35 pm, the last event time was 8:40 am, and EV=3 (a duty-cycle control function).

Therefore:

$|ET - RT| = 295$ $(EV_{max} * NUM) = (6 * 5) = 30$ $(EV * NUM) = (3 * 5) = 15$ $|ET - RT|MOD(EV_{max} * NUM)$ = remainder after 295/30 = 25

Since 25 is greater than [(EV*NUM)=15], the determination in step 302 is affirmative.

Intuitively, it can be seen that the current control interval will have commenced at 1:10 pm. At 1:35 pm, twenty-five minutes have elapsed since the beginning of the control interval. Since the set-up load is being controlled in accordance with a duty-cycle function in which the load is on only for the first fifteen minutes of each control interval, the load is to be off.

As another example, let it be assumed that EV=6, with the same real-time and event time as in the previous example.

Therefore:

$|ET - RT| = 295$ $(EV_{max} * NUM) = 30$ $(EV * NUM) = (6 * 5) = 30$ $|ET - RT|MOD(EV_{max} * NUM)$ = remainder after 295/30 = 25

Since 25 is less than [(EV*NUM)=30], the determination in step 302 is negative. In fact, when EV=6, the remainder can never be greater than or equal to (EV*NUM), so that the set-up load is always on.

Likewise, when EV=0, the remainder is always greater than or equal to (EV*NUM), so that the set-up load is always off.

If the determination in step 302 is affirmative, CPU 100 proceeds, in step 304, to clear the LDSTATUS bit for the set-up load. If the determination in step 302 is negative, CPU 100 proceeds, in step 306, to set the LDSTATUS bit for the set-up load. One such LDSTATUS bit is provided for each load, and is set when the associated load is to be on and is cleared when the associated load is to be off.

From either step 304 or step 306, CPU 100 proceeds, in step 308, to determine if the control event that has been addressed represents either an on or an off control function, i.e., does EV equal 6 or 0 (reference TABLE III). If the determination in step 308 is negative, e.g., the addressed event represents a duty cycle control function, CPU 100 proceeds, in step 310, to set a DCSTATUS bit for the set-up load. If the determination in step 308 is affirmative, CPU 100 proceeds, in step 312, to clear the DCSTATUS bit for the set-up load. One such DCSTATUS bit is provided for each load, and is set when the control event represents a duty-cycle control function, and is cleared when the control event represents either an on or an off control function.

If the determination in step 300 is negative, i.e., there are no valid ET/EV data words for the set-up load for the selected day or holiday, CPU 100 proceeds, in step 312, to address and search all event memory locations corresponding to the set-up load for the last valid ET/EV data word whose event time ET occurs before the real time represented by the RT field within the SDC register. In step 314, CPU 100 determines if the search in step 312 has been successful. If the determination in step 314 is affirmative, CPU 100 proceeds to determine the status of each load by proceeding through step 302 and the subsequent steps previously described.

Accordingly, if there are no control events in the event memory whose event times occur before or at real time in any real-time day, the microprocessor will control the status of the set-up load in accordance with the last control event whose event time occurs in one of the days preceding the real-time day. If the determination in step 314 is negative, i.e., there are no control events entered in the event memory for the set-up load, CPU 100 proceeds, in step 316, to clear the LDSTATUS bit and the DCSTATUS bit for the set-up load.

From either steps 310, 312 or 316, CPU 100 proceeds, in step 318 to determine if all loads have been updated. If the determination in step 318 is negative, CPU 100 proceeds, in step 320, to set-up for the next load, e.g., the next load number, and then returns to step 292 to repeat the load status updating as previously described. After all loads have been updated, the determination in step 318 is positive, whereupon CPU 100 proceeds, in step 322, to assemble and store the LBYTE date byte from the LDSTATUS bits determined during the pass through the LOAD UPDATE routine, and to assemble and store the STBT data byte from the DCSTATUS bits determined during the pass through the LOAD UPDATE routine.

As an example, let it be assumed that loads 1, 3, 4, 7 are to be on, and that loads 2, 4, 7 and 8 are being controlled with a duty-cycle control function.

Therefore:

|  | load number |
|---|---|
|  | 1 2 3 4 5 6 7 8 |
| LBYTE = | 1 0 1 1 0 0 1 0 |
| STBT = | 0 1 0 1 0 0 1 1 |

At this point, it should be noted that the actual energization states of the load relays are not changed until the microprocessor enters either its run/verify mode or its run mode, as hereinafter described. When CPU 100 enters the PROGRAM mode 242 upon the occurrence of an event memory malfunction (i.e., MEMFLG is set), all loads are turned off (reference the clearing of the output terminals in port 110A in steps 230 or 234, FIG. 7(b)). In all other cases where CPU 100 enters the PROGRAM mode 242, the loads are maintained on or off in accordance with the then-existing energization states of the load relays. Change of the energization states of the load relays can be effected only in the OUTPUT & STAGE routine (FIG. 20) which is described hereinafter. From step 322, CPU 100 returns to the mode routine.

While still in step 244 in the PROGRAM mode 242, CPU 100 will call the REAL-TIME SET routine illustrated in FIG. 10. The user will have been instructed to select a desired time by advancing the time displayed in display 28, LEDs 30, 32 and LEDs 40 through actuation of the DAY, HOUR, and MINUTE keys in the keyboard 38, and then to actuate the SET TIME switch 34. Initially, a determination is made, in step 330, as to whether the SET TIME switch 34 has been actuated. If the determination in step 330 is negative, CPU 100 returns to the mode routine. If the determination in step 330 is affirmative, e.g., the user wishes to change the time within the hardware clock, CPU 100 proceeds to effect such an adjustment only if CPU 100 is in the PROGRAM mode 242 and if the user has not caused the HOL LED 40 to be lit. Accordingly, a determination is made in step 332 as to whether PROFL has been set and a determination is made in step 334 as to whether the HOLI field in the DPLR register has been set. If the determination in step 332 is negative or if the determination in step 334 is affirmative, CPU 100 proceeds, in step 336, to set TFAULT to a count representing 0.1 seconds, and sets the FAULT LED 44 until the count in TFAULT is decremented to zero, thereby signifying to the user that the desired time adjustment cannot be made. From step 336, CPU 100 returns to the mode routine.

If the determination in step 332 is positive and the determination in step 334 is negative, however, CPU 100 proceeds, in step 338, to convert the information in the TIME and DAY fields in the DPLR register to binary minutes, and to store the same in an internal register within CPU 100. From step 338, CPU 100 proceeds, in step 340, to determine if the STANDARD/DAYLIGHT switch 36 has been set to the DAYLIGHT position. If the determination in step 340 is positive, CPU 100 proceeds, in step 342, to subtract the binary representation of sixty minutes from the time stored in its internal register (since the time in the hardware clock is always in standard time). From step 342, or, if the determination in step 340 is negative, CPU 100 proceeds, in step 344, to increment the time information within the hardware clock (by resetting counter 124 and by supplying a high frequency signal to counter 128 through gate 126, as previously described with reference to FIG. 2). Thereafter, CPU 100, in step 346, compares the time information within the hardware clock (which is in binary minutes) with the time in its internal register, and continues looping through step 344 and step 346 until the determination in step 346 is affirmative.

Since the time information in the hardware clock has been changed, CPU 100 jumps to the REAL-TIME CLOCK routine from step 346, whereupon the contents of the SDC register are updated, and then proceeds through the LOAD UPDATE routine, whereupon the status of the loads is updated, as previously described. From the LOAD UPDATE routine, CPU 100, returns to the mode routine (e.g., calls the KEYBOARD routine in step 244.)

Let it be assumed that the user has completed entry of the predetermined schedule into the microprocessor, and desires the microprocessor to assume control of the loads in accordance with the thus-entered schedule. Accordingly, the user will place the mode switch 26 to either its RUN or its RUN/VERIFY positions. Let it also be assumed that no event memory malfunction or program timing error has transpired.

As a result, CPU 100, upon exiting from the PROGRAM mode 242, FIG. 7(b), passes through steps 203, 204, 206, 210, 212 and 218 to step 220, FIG. 7(a). Since PROFL was set when the microprocessor entered its program mode, the determination in step 220 is affirmative, whereupon CPU 100 proceeds to step 222. Since the mode switch 26 has been moved from its PROGRAM position, the determination in step 222 is negative, whereupon CPU 100, in step 224, clears PROFL and extinguishes the PROGRAM LED 27. From step 224, CPU 100 proceeds, through step 228, to step 236, in which a determination is made as to whether the mode switch 26 has been set to the RUN position. Let it be assumed that the user has selected the RUN/VERIFY position of mode switch 26, in which case the determination in step 236 is negative, so that CPU 100 proceeds to the RUN/VERIFY mode 240.

At this point, it should be noted that the microprocessor will also enter its run or run/verify modes of operation upon the determination of a POWER UP condition, provided that no event memory malfunction has occurred. For example, CPU 100 will proceed through steps 200, 202, 203, 204, 206, 210, 212, 218, 220, 224 and 228 to step 236. In this case, it should be remembered that PRFLG was set in step 202 and has not yet been cleared. Likewise, if the microprocessor proceeds to either the run or run/verify modes from the program mode, it should be remembered that PRFLG was set in steps 202, 226 or 234 and has not yet been cleared.

While in the RUN/VERIFY mode 240, CPU 100 clears the LEDs 42 and successively calls: the REAL-TIME CLOCK routine (and the LOAD UPDATE routine) to permit updating of the contents of the SDC register and to permit updating of load status, as previously described; an XFER routine; the KEYBOARD routine (and its associated subroutines); and, the OUTPUT & STAGE routine.

Figure 11:
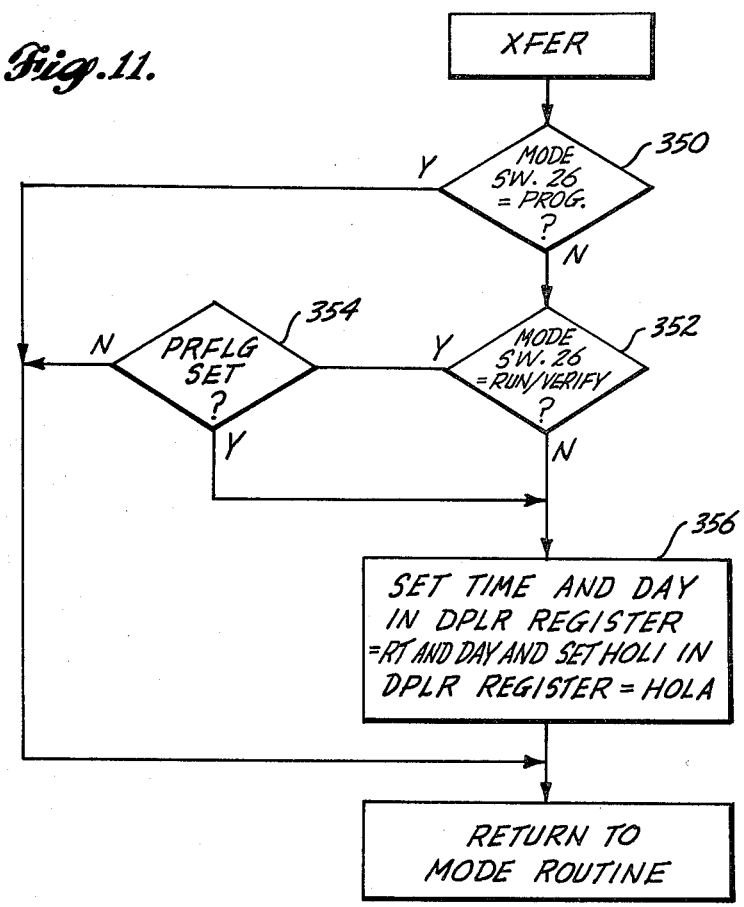
FIG. 11 is a flow chart of the program steps undertaken by the microprocessor in a XFER routine.

Referring now to the XFER routine illustrated in FIG. 11, CPU 100 initially determines, in step 350, if the mode switch 26 has been set to its PROGRAM position. If the determination in step 350 is affirmative, CPU 100 returns to the mode routine. If the determination in step 350 is negative, CPU 100 proceeds in step 352, to determine if the mode switch 26 has been set to its RUN/VERITY position. In the circumstance being discussed, the determination in step 352 is affirmative, whereupon CPU 100 proceeds, in step 354, to determine if PRFLG has been set. If the determination in step 354 is negative, CPU 100 returns to the mode routine. However, if the determination in step 352 is negative, or if the determination in step 354 is affirmative, CPU 100 proceeds, in step 356, to transfer the contents of the RT, LOAD and DAY fields within the SDC register to the LOAD, TIME and DAY fields in the DPLR register, and to set the HOLI field in the DPLR register equal to the HOLA field in the SDC register. Since the LOAD field in the SDC register contains invalid data, the LOAD character display in display 28 will be blanked. However, the remaining character displays in display 28, LEDs 30, 32 and LEDs 40 will display real-time information.

Now, PRFLG is cleared during the subsequent OUTPUT & STAGE routine. Therefore, CPU 100 proceeds to step 356, wherein real-time information is displayed to the user, only if the mode switch is in its RUN position, or upon the first pass of CPU 100 through the RUN/VERIFY mode 240 following a POWER UP condition or following the placing of the mode switch 26 from its PROGRAM position to RUN/VERIFY position. From step 356, CPU 100 returns to the mode routine.

While in the RUN/VERIFY mode 240, CPU 100 next calls the KEYBOARD routine. By reference to Table II, only the HOLIDAY, TIME, SCAN, MINUTE, HOUR, DAY, and LOAD keys in keyboard 38 are active during the RUN/VERIFY mode 240.

Upon actuation of either the MINUTE, HOUR, DAY or LOAD keys, the user may cause any desired time, day or load to be displayed as previously described.

Upon actuation of the HOLIDAY key, CPU 100 proceeds to the HOLIDAY key function subroutine illustrated in FIG. 18. The user will have been instructed to actuate the HOLIDAY key after advancing the day that is being displayed to the day selected as a holiday (through actuation of the DAY key). In step 460, CPU 100 sets the HOFLG operation flag, and sets the HOLYB bit (in HOLY) corresponding to the day represented by the DAY field in the DPLR register, and then returns to the mode routine.

When HOFLG has been set, CPU 100, upon its next pass through the REAL-TIME CLOCK routine (FIG. 8), updates the contents of the SDC register, irrespective of whether PWFLG has been set or whether there has been a change in the time within the hardware clock. As CPU 100 proceeds through the REAL-TIME CLOCK routine, it will be noted that the HOLYB bit for the day previous to that represented by the DAY field in the SDC register will be cleared to accordingly deflag that day as a holiday, and that the HOLA field in the SDC register will either be set or cleared, depending upon whether the HOLYB bit has been set for the day represented by the DAY field in the SDC register (reference steps 278, 280, 282 and 284). Accordingly, by causing CPU 100 to pass through the entire REAL-TIME CLOCK routine after the HOLIDAY key has been actuated, i.e., HOFLG has been set, load control may be immediately shifted to a holiday schedule (in the subsequent LOAD UPDATE routine) if the day in real time has been selected as a holiday.

The user may wish to obtain a readout of the schedule for a given load and for any day of the week or for the holiday. Accordingly, when CPU 100 is in the PROGRAM mode 242 or the RUN/VERIFY mode 240, actuation of the SCAN key causes CPU 100 to enter into the SCAN key function subroutine illustrated in FIG. 15. Initially, CPU 100, in step 410, determines if PROFL is set, i.e., if the microprocessor is in its program mode of operation. If the determination in step 410 is affirmative, CPU 100 proceeds, in step 412, to address and search the event memory locations corresponding to the day and load represented by the LOAD and DAY or HOLI fields in the DPLR register. When the microprocessor is in its run/verify mode of operation, the determination in step 410 will be negative, so that CPU 100 proceeds, in step 414, to determine if HOLYB bit has been set for the day represented by the DAY field in the DPLR register. At this point, it should be noted that when the microprocessor is in its run/verify mode of operation, the HOLI field will not be set if the day in real-time is not a holiday. Accordingly, if the determination in step 414 is affirmative, CPU 100, in step 416, addresses and searches the holiday event memory locations corresponding to the load represented by the LOAD field in the DPLR register. If the determination in step 414 is negative, CPU 100 proceeds in step 412 to address and search the event memory locations corresponding to the load and day represented by the LOAD and DAY fields in the DPLR register.

After addressing and searching of the desired event memory locations in steps 412 or 416, CPU 100 proceeds, in step 418, to determine if the addressed event memory locations contain any valid ET/EV data words. If the determination in step 418 is negative, CPU 100 returns to the mode routine. If the determination in step 418 is affirmative, CPU 100 proceeds, in step 420, to find the first valid ET/EV data word in the addressed event memory locations whose event time ET occurs after the time represented by the TIME fields in the DPLR register. Accordingly, the use may instruct the microprocessor to display information relating to the first valid control event that occurs after any desired time.

From step 420, CPU 100 proceeds, in step 422, to convert the event time ET to BCD form, and to store the thus-converted event time in the TIME fields in the DPLR register, whereupon the event time is displayed to the user. Thereafter, in step 424, CPU 100 lights the LED 42 corresponding to the control event (EV) of the selected ET/EV data word.

CPU 100 then proceeds, in step 426, to determine if the SCAN key is still being actuated. For example, the user may wish to obtain a display of more than one control event during the selected day. If the determination in step 426 is negative, i.e., the user has released the SCAN key, CPU 100 returns to the mode routine. If the determination in step 426 is affirmative, however, CPU 100 proceeds, in step 428, to set the TSCAN timer to a count representing two seconds, and waits until the count within TSCAN has decremented to zero. Thereafter, in step 430, CPU 100 proceeds to find and display the next control event (by undertaking steps similar to steps 420,422 and 424). In step 432, CPU 100 determines if the control event displayed in step 430 is the last event of the day represented by the DAY field in the DPLR register, i.e., the control event having the last event time. If the determination in step 432 is negative, CPU 100 returns to step 426. If the determination in step 432 is affirmative, CPU 100, in step 434, sets TSCAN to two seconds and waits until TSCAN equals zero. CPU 100 then proceeds, in step 436, to find and display the first event of the day represented by the DAY field in the DPLR register, e.g., the control event having the earliest event time. From step 436, CPU 100 returns to step 426. As can be appreciated, CPU 100 will continue to progress through the loops defined by steps 426–436 until the user releases the SCAN key, at which time CPU 100 returns to the mode routine. To obtain a readout of the schedule for yet another load, the user will select the desired load and day, by actuation of the LOAD and DAY keys, and thereafter actuate the SCAN key.

While CPU 100 is in either the PROGRAM mode 242 or the RUN/VERIFY mode 240, the user may wish to obtain a display of real-time information. Accordingly, actuation of the TIME key causes CPU 100 to enter into the TIME key function subroutine illustrated in FIG. 19. Specifically, CPU 100, in step 470, transfers the contents of the RT and DAY fields within the SDC register to the TIME and DAY fields in the DPLR register, whereupon realtime information is displayed to the user. From step 470, CPU 100 returns to the mode routine.

Figure 20:
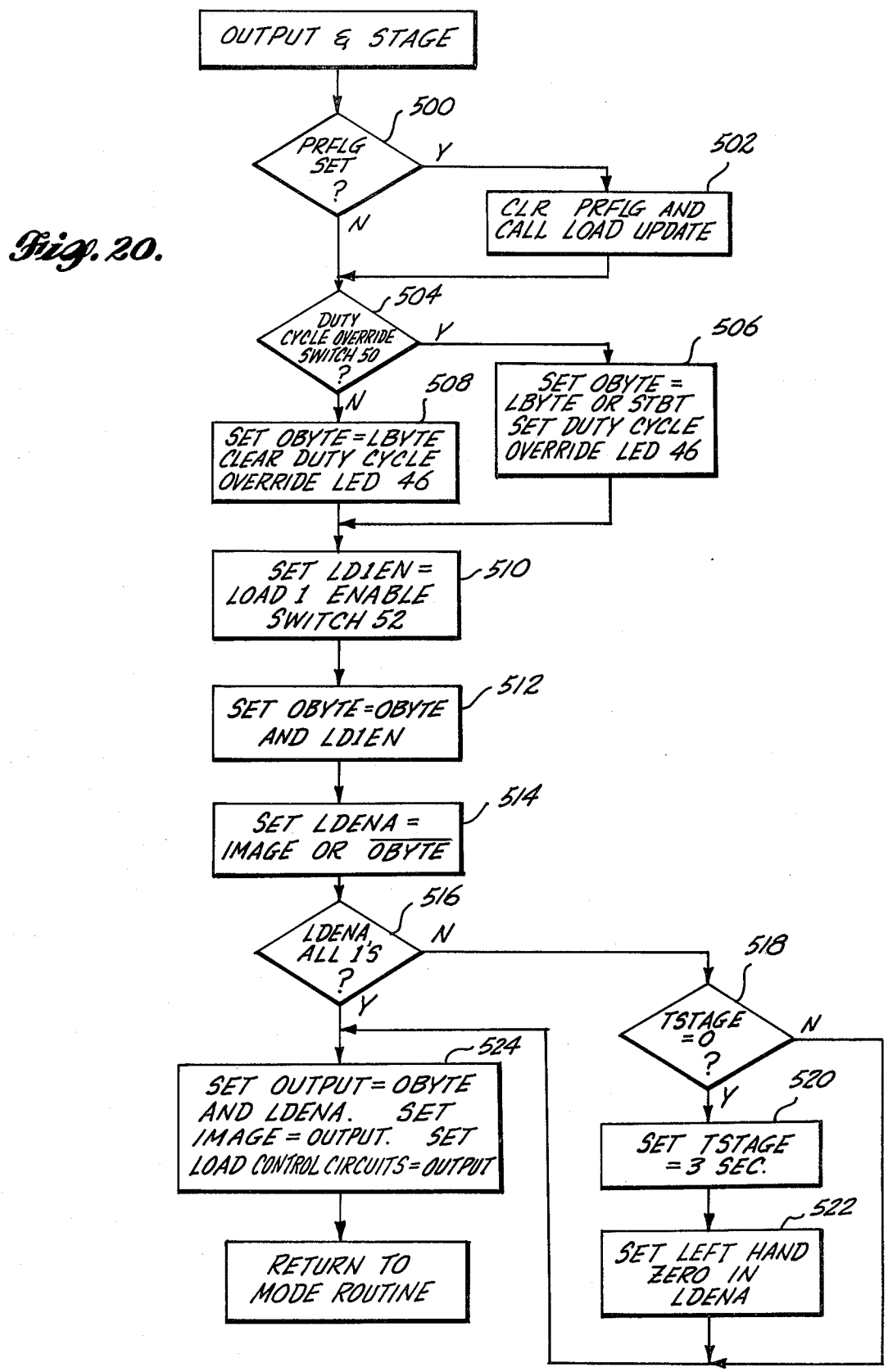
FIG. 20 is a flow chart of the program steps undertaken by the microprocessor in an OUTPUT & STAGE subroutine.

While still in step 252 within the RUN/VERIFY mode 240, CPU 100 next calls the OUTPUT & STAGE routine illustrated in FIG. 20. Initially, CPU 100, in step 500, determines if PRFLG has been set, i.e., a POWER UP condition has occurred, or an event memory malfunction has occurred, or the microprocessor has just exited from its program mode of operation. If the determination in step 500 is affirmative, CPU 100, in step 502, clears PRFLG and calls the LOAD UPDATE routine (FIG. 9) to accordingly update the status of all loads. From either step 500 or step 502, CPU 100 proceeds, in step 504, to determine if the duty-cycle override switch 50 has been set, i.e., the set of external contacts represented by the duty-cycle override switch 50 have been closed to accordingly signify to the microprocessor that all loads which are currently being controlled with a duty-cycle control function are to be turned on. If the determination in step 504 is affirmative, CPU 100 proceeds, in step 506, to set OBYTE=LBYTE OR STBT, and, sets the DUTY-CYCLE OVERRIDE LED 46. If the determination in step 504 is negative, CPU 100 proceeds, in step 508, to set OBYTE=LBYTE, and to clear the DUTY-CYCLE OVERRIDE LED 46.

From either step 506 or 508, CPU 100, in step 510, sets LDIEN to correspond to the position of the load 1 enable switch 52. Specifically, LDIEN=1 when the load 1 enable switch 52 is closed (e.g., the control of load 1 by the microprocessor is to be enabled), and LDIEN=0 when the load 1 enable switch 52 is opened.

In step 512, CPU 100 sets OBYTE=OBYTE AND LDIEN. From step 512, CPU 100 proceeds, in step 514, to set LDENA=IMAGE OR $\overline{\text{OBYTE}}$, where the successive data bits of IMAGE represent the existing energization states of the load relays. CPU 100 then proceeds, in step 516, to determine if the successive data bits of LDENA are all ones, i.e., set. As will be apparent from the ensuing discussion, the determination in step 516 is negative if any load which has been previously off is to be turned on. If the determination in step 516 is negative, CPU 100 proceeds to stage or sequence the turning on of one or more loads previously off by proceeding, in step 518, to determine if the TSTAGE timer contains a count of zero. Upon the first pass through the OUTPUT & STAGE routine, the determination in step 518 will be affirmative, so that CPU 100 proceeds, in step 520, to set TSTAGE to a count representing three seconds. From step 520, CPU 100 proceeds, in step 522, to set the left hand "0" bit in LEDNA to "1". As will be apparent from the ensuing discussion, the action undertaken in step 522 allows a single load that has been previously off to be turned on.

If the determination in step 516 is affirmative, or if the determination in step 518 is negative, or from step 522, CPU 100 proceeds, in step 524, to set the OUTPUT=OBYTE AND LDENA, to set IMAGE=OUTPUT and to control the energization states of the load control circuits 145 in accordance with OUTPUT. From step 524, CPU 100 returns to the mode routine.

The operation of the OUTPUT & STAGE routine can best be understood by considering the logical operations that take place when (a) a plurality of loads are turned on after all loads have been previously turned off; (b) the duty-cycle override switch 50 is closed during the time that some of the loads are currently being controlled in accordance with a duty-cycle control function; and (c) the load 1 enable switch 52 is opened during the time that load 1 is turned on, as set forth hereinafter in Tables IV, V and VI, respectively.

TABLE IV

Example (a):
(1) all loads previously turned off
(2) loads 1, 3, 4, 7 to be turned on
(3) duty-cycle override switch 50 opened
(4) load 1 enable switch 52 closed

| | | |
|---|---|---|
| IMAGE | = | 00000000 |
| LBYTE | = | 10110010 |
| OBYTE | = | LBYTE |
| | = | 10110010 |
| LDIEN | = | 1 |
| OBYTE | = | OBYTE AND LD1EN |
| | = | 10110010 |
| $\overline{\text{OBYTE}}$ | = | 01001101 |
| LDENA | = | IMAGE OR $\overline{\text{OBYTE}}$ |
| | = | 01001101 |

Since LDENA not all 1's,
set TSTAGE = 3 seconds
set LDENA = 11001101

| | | |
|---|---|---|
| OUTPUT | = | OBYTE AND LDENA |
| | = | 10000000 |

TABLE IV-continued

Example (a):

Since LDENA not all 1's, and when TSTAGE = 0,
   set TSTAGE = 3 seconds,
   set LDENA = 11101101
      OUTPUT   = OBYTE AND LDENA
                   = 10100000
Since LDENA not all 1's, and when TSTAGE = 0,
   set TSTAGE = 3 seconds,
   set LDENA = 11111101
      OUTPUT   = OBYTE AND LDENA
                   = 10110000
Since LDENA not all 1's, and when TSTAGE = 0,
   set TSTAGE = 3 seconds,
   set LDENA = 11111111
      OUTPUT   = OBYTE AND LDENA
                   = 10110010

TABLE V

Example (b):

(1) loads 1, 3, 4, 7 previously turned on
(2) no change in load status
(3) loads 2, 4, 7, 8 are being controlled with a duty-cycle control function
(4) duty-cycle override switch 50 closed
(5) load 1 enable switch 52 closed
   IMAGE   = 10110010
   LBYTE   = 10110010
   STBT    = 01010011
   OBYTE   = LYBTE OR STBT
             = 11110011
   LD1EN   = 1
   OBYTE   = OBYTE AND LD1EN
             = 11110011
   $\overline{OBYTE}$ = 00001100
   LDENA   = IMAGE OR $\overline{OBYTE}$
             = 10111110
Since LDENA not all 1's
   set TSTAGE = 3 seconds,
   set LDENA = 11111110
      OUTPUT   = OBYTE AND LDENA
                   = 11110010
Since LDENA not all 1's, and when TSTAGE = 0,
   set TSTAGE = 3 seconds,
   set LDENA = 11111111
      OUTPUT   = OBYTE AND LDENA
                   = 11110011

TABLE VI

Example (c):

(1) loads 1, 3, 4, 7 previously turned on
(2) no change in load status
(3) duty-cycle override switch 50 opened
(4) load 1 enable switch 52 opened
   IMAGE   = 10110010
   LBYTE   = 10110010
   OBYTE   = 10110010
   LD1EN   = 0
   OBYTE   = OBYTE AND LD1EN
             = 00110010
   $\overline{OBYTE}$ = 11001101
   LDENA   = IMAGE OR $\overline{OBYTE}$
             = 11111111
Since LDENA all 1's,
      OUTPUT   = OBYTE AND LDENA
                   = 00110010

Therefore, when all loads have previously been turned off, as in Example (a), the OUTPUT & STAGE routine energizes the load control circuits 145 for loads 1, 3, 4 and 7 at three-second intervals, to prevent a potential large inrush of power at the facility that would occur if all loads were to be turned on at the same time. When the duty-cycle override switch 50 is closed, all loads that are currently being controlled with a duty-cycle control function and that are currently off, e.g., loads 2 and 8 in Example (b), are turned on at three-second intervals. As illustrated in Example (c), opening of the load 1 enable switch 52 results in de-energization of the load control circuit 145 for load 1, irrespective of the desired status for load 1 determined in accordance with the schedule for load control.

From step 524, CPU 100 returns to the mode routine. From the RUN/VERIFY mode 240, CPU 100, returns to step 203. For as long as the mode switch 26 is set to the RUN/VERIFY position CPU 100 will continue to loop back to and through the RUN/VERIFY mode 240. If the user should place the mode switch 26 to its RUN position, the determination in step 236 will be affirmative, so that CPU 100 proceeds to the RUN mode 238, wherein the LEDs 42 are cleared. Thereafter, CPU 100 calls the REAL-TIME CLOCK, XFER and OUTPUT & STAGE routines, and proceeds through those routines identically as previously described. No provision is made, however, in the RUN mode 238 for CPU 100 to call the KEYBOARD routine, so that the keyboard 38 is disabled.

Figure 21:
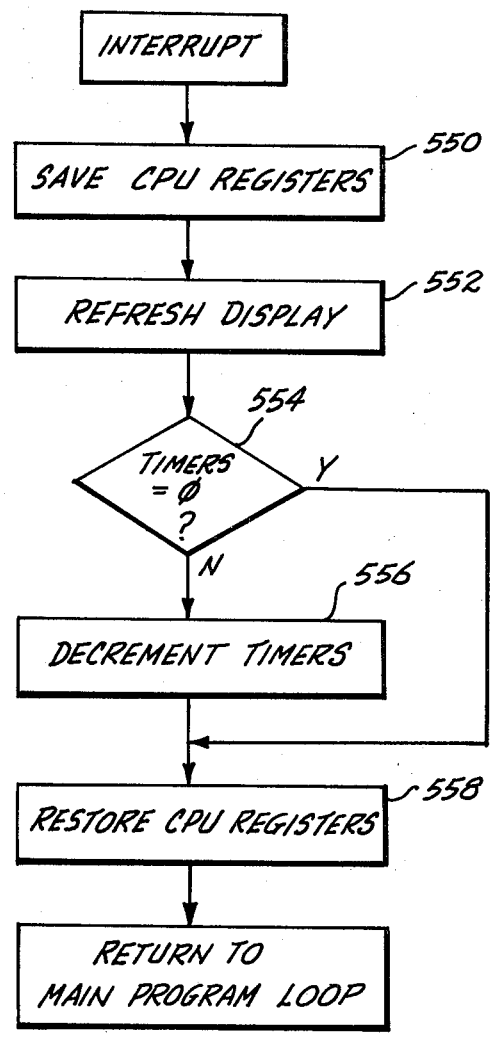
FIG. 21 is a flow chart of the program steps undertaken by the microprocessor in an INTERRUPT subroutine.

With reference now to FIG. 21, the third clock signal from the hardware clock, appearing on the RST 7.5 input of CPU 100, causes CPU 100 to enter the INTERRUPT routine once every cycle of the third clock signal (e.g., at a rate of 256 Hz). In step 550, the contents of various internal registers within CPU 100 are maintained, by transferring the contents thereof to the stack register previously described. Thereafter, CPU 100, in step 552, refreshes the displays 28 and 142 by transferring the contents of the TIME, DAY and HOLI fields in the DPLR register to ports 108 and 110B. In step 554, CPU 100 determines if any of the timers in RAM 104 contain a count of zero. If the determination in step 544 is negative for any timer, CPU 100 proceeds, in step 556, to decrement that timer by an amount related to the period of the signal from the hardware clock, and then proceeds to step 558. If the determination in step 554 is affirmative for any of the timers within RAM 104, i.e., the timer has a count of zero, CPU 100 proceeds directly to step 558. In step 558, CPU 100 restores its internal registers (by transferring the contents of the stack register thereto) and then returns to the main program loop to continue processing therein.

While the invention has been described with reference to a preferred embodiment thereof, it should be understood that the invention is not limited thereto, but is to be interpreted only in conjunction with the appended claims.

The embodiments of the invention in which an exclusive property or privilege is claimed are defined as follows:

1. An electronic controller for controlling the energization states of each of a plurality of electrical loads in real-time, said controller comprising:
   a plurality of load control circuits, each said load control circuit being adapted to be interconnected with a load, and having a load-on state when its load is to be on, and a load-off state when its load is to be off;
   clock means for accumulating real-time information; and,
   a data processor, including:
      an event memory for storing a plurality of load groups of information, each said load group being uniquely associated with one of the plurality of electrical loads and comprising one or more control events and an event time corresponding to each said control event, said control events in each said load group representing: an on control function in which the associated load is to be on for the entirety of each predetermined control interval successive to the corresponding event time; an off control function in which the associated load is to be off for the entirety of each predetermined control interval successive to the corresponding event time; and, a duty-cycle control function in which the associated load is to be on for a predetermined portion of each predetermined control interval successive to the corresponding event time;

a program memory storing a set of program instructions; and, a processing means operative in response to said set of program instructions stored in said program memory, said processing means including: means operative to enter said control events and corresponding event times for each load into the associated load group in said event memory; means for obtaining said real-time information from said clock means; means for addressing and searching the associated load group for each load in said event memory to effect comparison of said event times therein with said real-time information obtained from said clock means; and, means for placing said load control circuit for each load in said load-on state or said load-off state in accordance with that one of said control events in said associated load group whose corresponding event time is at or immediately procedes the time represented by said real-time information obtained from said clock means.

2. A controller as recited in claim 1, wherein each said load control circuit includes a load control switch having first, second and third positions; said load control switch when in said first and second positions forcing its associated load control circuit to its load-on and load-off states, respectively; said load control switch when in said third position permitting its associated load control circuit to be placed in its load-on or load-off states by said processing means within said data processor.

3. A controller as recited in claims 1 or 2, wherein said data processor includes means for visually displaying whether each said load control circuit is in its load-on state or its load-off state.

4. A controller as recited in claim 1, wherein said real-time information in said clock means represents elapsed time from the beginning of a week; wherein each said load group is said event memory includes a plurality of day groups, one for each day of the week; and, wherein said processing means is operative to address and search that one of said day groups in each said load group that corresponds to the day represented by said real-time information.

5. A controller as recited in claim 4, wherein said processing means is operative to address and search those day groups in any one of said plurality of load groups that correspond to days preceding the day represented by said real-time information, upon absence of any control events in the day group in said any one of said plurality of load groups corresponding to the day represented by said real-time information.

6. A controller as recited in claim 4, wherein each said load group in said event memory further includes a holiday group; wherein said data processor further includes means for flagging any day of a week as a holiday; and, wherein said processing means is operative to address and search said holiday group in each said load group, rather than a day group therein, when the day represented by said real-time information corresponds to the day flagged as a holiday.

7. A controller as recited in claim 6, wherein said data processor further includes means for deflagging a day as a holiday when the day represented by said real-time information is the day in the week subsequent to the day flagged as a holiday.

8. A controller as recited in claim 1, wherein said processing means is operative to place each load control circuit into its load-off state only if the relationship $$|ET\text{-}RT|MOD(EV_{max}*NUM) \geqq (EV*NUM)$$

is satisfied, where
$|ET\text{-}RT|$ is the absolute difference, in minutes, between an event time and the time in said real-time information,
NUM is the smallest number of minutes during a control interval for which a change in energization state of a load will be effected,
EV is an integer representing a control event, ranging from $EV_{min}=0$ for an off control function to $EV_{max}$ for an on control function, and
$(EV_{max}*NUM)$ is the number of minutes in a control interval.

9. A controller as recited in claim 8, wherein the control interval is thirty minutes, where NUM=5, and where $EV_{max}=6$.

10. A controller as recited in claim 1, wherein said data processor further includes means for detecting a duty-cycle override signal from an external device; and wherein said processing means is responsive to said detected duty-cycle override signal to place the load control circuit, for each load that is being controlled in accordance with a duty-cycle control function, into its load-on state for the duration of said detected duty-cycle override signal.

11. A controller as recited in claim 1, wherein said data processor further includes means for detecting a load enable signal; and, wherein said processing means is enabled to place the load control circuit for a particular one of the loads into its load-on or load-off states in accordance with the control events in the associated load group only in response to and for the duration of said detected load enable signal.

12. A controller as recited in claim 1, wherein said processing means is further operative to place a plurality of said load control circuits that have previously been in said load-off states into said load-on states in a predetermined sequence and at predetermined intervals.

13. A controller as recited in claim 1, wherein said data processor further includes means for adjusting said real-time information in said clock means.

14. A controller as recited in claim 1, wherein said data processor includes means for selecting a load, a control event, and an event time.

15. A controller as recited in claim 14, wherein said means for selecting comprises a keyboard.

16. A controller as recited in claim 15, wherein said keyboard includes a load key, a plurality of keys for selecting a time, and a plurality of event keys for selecting a control event, each said event key corresponding to a predetermined control event; wherein said data processor further includes load display means and time display means; and, wherein said processing means is operative to:
- advance the load displayed by said load display means upon actuation of said load key;
- advance the time displayed by said time display means upon actuation of said keys for selecting a time; and,
- upon actuation of one of said event keys, store, in the load group in said event memory corresponding to the load displayed by said load display means, information representing: a control event corresponding to that one of said event keys that has been actuated; and, an event time corresponding to the time displayed by said time display means.

17. A controller as recited in claim 16, wherein said real-time information in said clock means represents elapsed time since the beginning of a week; wherein each said load group in said event memory includes a plurality of day groups, one for each day of the week; wherein said keyboard includes a day key for selecting a day of the week; wherein said data processor includes day display means; and, wherein said processing means is operative to:
- advance the day displayed by said day display means upon actuation of said day key; and,
- upon actuation of one of said event keys, store, in the day group in said event memory corresponding to the day displayed by said day display means, said day group being within the load group corresponding to the load displayed by said load display means, information representing: a control event corresponding to that one of said event keys that has been actuated; and, an event time corresponding to the time displayed by said time display means.

18. A controller as recited in claim 17, wherein said keyboard includes a repeat key; and, wherein said processing means is operative, upon actuation of said repeat key, to copy the information in the day group within the load group corresponding to the day and load displayed by said day display means and said load display means, into a day group within said load group that corresponds to a day next subsequent to the day displayed by said day display means.

19. A controller as recited in claim 17, wherein said keyboard includes a clear key; and, wherein said processing means is operative, upon actuation of said clear key, to clear the information in the day group within the load group corresponding to the day and load displayed by said day display means and said load display means.

20. A controller as recited in claims 14, 15, 16, 17, 18 or 19, wherein said data processor further includes event display means for displaying information relating to said control events.

21. A controller as recited in claim 17, wherein said data processor further comprises event display means for displaying information relating to said control events; wherein said keyboard includes a scan key; and, wherein said processing means is operative, upon actuation of said scan key, to transfer information from said event memory to said event display means and to said time display means, said information comprising that in the day group within the load group in said event memory corresponding to the day and load displayed by said day display means and said load display means.

22. A controller as recited in claim 17, wherein said keyboard includes a time key; and wherein said processing means is operative, upon actuation of said time key, to transfer the time represented by said real-time information obtained from said clock means to said time display means to said day display means.

23. A controller as recited in claim 1, wherein said data processor further includes a program switch and a program enable switch; and, wherein said processing means is operative, upon actuation of said program switch, to enable the entry of information into said event memory, but only if said program switch has been actuated within a predetermined time following actuation of said program enable switch.

24. A controller as recited in claim 1, wherein said data processor further includes a standard/daylight switch; and, wherein said processing means is operative, upon actuation of said standard/daylight switch, to advance the real-time information used thereby by sixty minutes from the real-time information obtained from said clock means.

25. A controller as recited in claim 1, further comprising a power supply adapted to be powered from a source of alternating current voltage, said power supply including: means for providing supply voltages to said plurality of load control circuits, and to said program memory and said processing means in said data processor; a rechargeable battery for providing supply voltages to said clock means and to said event memory in said data processor; means for charging said battery from the source of alternating current voltage; and, means for providing an output signal upon detection of a low voltage condition in the source of alternating current voltage; and,
- wherein said processing means is responsive to said output signal to place said plurality of load control circuits in their load-off states.

* * * * *

UNITED STATES PATENT AND TRADEMARK OFFICE
CERTIFICATE OF CORRECTION

PATENT NO. : 4,293,915

DATED : October 6, 1981

INVENTOR(S) : Carpenter et al.

It is certified that error appears in the above-identified patent and that said Letters Patent are hereby corrected as shown below:

Column 4, line 59, "prevent" is changed to --provide--
Column 9, lines 52 and 53, "A1-1" is changed to --All--
Column 10, line 3, "permits" is changed to --permit--
Column 11, line 24, "count, is" is changed to --count is--
Column 12, line 19, "left hand" is changed to --left-hand--
Column 12, line 21, "right hand" is changed to --right-hand--
Column 13, line 37, "acrodd" is changed to --across--
Column 14, line 48, "(display" is changed to --(display)--
Column 15, line 33, "HOL)," is changed to --HOL).--
Column 16, line 18, "work" is changed to --word--
Column 18, line 45, "is step" is changed to --in step--
Column 21, line 67, "realtime" is changed to --real-time--
Column 31, line 55, "OBYTE = 11001101" is changed to --$\overline{OBYTE}$ = 11001101--
Column 31, line 56, "LDENA" = IMAGE OR OBYTE" is changed to --LDENA = IMAGE OR $\overline{OBYTE}$--
Column 31, line 59, "OUTPUT = $\overline{OBYTE}$ AND LDENA" is changed to OUTPUT = OBYTE AND LDENA--
Column 33, line 35, "pro" is changed to --pre--
Column 36, line 21, insert --and-- before "to"

Signed and Sealed this

Twentieth Day of April 1982

[SEAL]

Attest:

GERALD J. MOSSINGHOFF

Attesting Officer   Commissioner of Patents and Trademarks